United States Patent [19]  
Jenkins et al.

[11] 3,928,319  
[45] *Dec. 23, 1975

[54] 4′-FLUORO NUCLEOSIDES, NOVEL INTERMEDIATES AND METHODS OF PREPARING SAME

[75] Inventors: Ian Jenkins, Brighton, England; John G. Moffatt; Julien P. H. Verheyden, both of Los Altos, Calif.

[73] Assignee: Syntex (U.S.A.) Inc., Palo Alto, Calif.

[ * ] Notice: The portion of the term of this patent subsequent to June 18, 1991, has been disclaimed.

[22] Filed: May 31, 1972

[21] Appl. No.: 258,327

Related U.S. Application Data

[63] Continuation-in-part of Ser. No. 153,817, June 16, 1971, Pat. No. 3,817,978.

[52] U.S. Cl. ............................ 260/211.5 R; 424/180
[51] Int. Cl.² ................ C07H 19/16; C07H 19/20
[58] Field of Search ........................... 260/211.5 R

[56] References Cited
UNITED STATES PATENTS

| | | | |
|---|---|---|---|
| 3,562,250 | 2/1971 | Langen et al. | 260/211.5 R |
| 3,575,959 | 4/1971 | Shen et al. | 260/211.5 R |
| 3,585,189 | 6/1971 | Verheyden et al. | 260/211.5 R |
| 3,622,561 | 11/1971 | Robins et al. | 260/211.5 R |
| 3,817,978 | 6/1974 | Jenkins et al. | 260/211.5 R |

*Primary Examiner*—Johnnie R. Brown
*Attorney, Agent, or Firm*—Joseph I. Hirsch; Lawrence S. Squires; William B. Walker

[57] ABSTRACT

4′-fluoro nucleosides, 4′-fluoro nucleoside analogs of Nucleocidin, 2′-deoxy-4′-fluoro pyrimidine nucleosides and novel intermediates produced in the process of preparing such compounds. The process for preparing the 4′-fluoro nucleosides of the present invention comprises treating a 4′,5′-unsaturated nucleoside with iodine monofluoride to form the corresponding 5′-deoxy-4′-fluoro-5′-iodo nucleoside. The latter product is transformed to corresponding 5′-azido-5′-deoxy-4′-fluoro nucleosides, 5′-amino-5′-deoxy-4′-fluoro nucleosides, 5′-deoxy-4′-fluoro nucleosides, 4′-fluoro nucleosides, 5′-O-phosphoryl-4′-fluoro nucleosides, and 5′-sulfamoyl-4′-fluoro nucleosides. The 2′-deoxy-4′-fluoro pyrimidine nucleosides are prepared in an analogous manner from the 4′,5′-unsaturated-2′-deoxy nucleosides. The nucleosides of this invention exhibit general antimetabolite activity and/or are intermediates for compounds exhibiting such activity.

37 Claims, No Drawings

4'-FLUORO NUCLEOSIDES, NOVEL INTERMEDIATES AND METHODS OF PREPARING SAME

CROSS REFERENCE TO RELATED APPLICATION

This application is a continuation-in-part application of application Ser. No. 153,817, filed June 16, 1971 now U.S. Pat. No. 3,817,978.

BACKGROUND OF THE INVENTION

This invention relates to 4'-fluoro nucleosides, 2'-deoxy-4'-fluoro pyrimidine nucleosides, and to methods of preparing such compounds. In a further aspect, this invention relates to novel intermediates produced in the process of preparing such compounds. This invention also relates to synthetic 4'-fluoro nucleoside analogs of the naturally occurring anti-trypanosomal agent Nucleocidin, to methods of preparing such nucleoside analogs and novel intermediates produced in the process of preparing such analogs.

Since the isolation of Nucleocidin and the discovery of its antibiotic activity and particularly of its antitrypanosomal activity [note Hewitt et al., Antibiotics Annual, p. 722 (1956–1957)] and determination of its nucleoside structure (Morten et al., J.A.C.S. v.91,1535, (1969) considerable interest has developed with respect to the possible synthesis of other nucleosides having antibiotic activity. However, because of the complexities involved and the general unstable character of nucleosides, very little progress has been made in this quest.

SUMMARY OF THE INVENTION

The nucleoside compounds of the present invention can be represented by the following formulas:

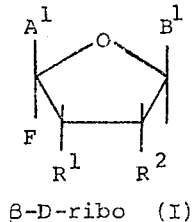

β-D-ribo (I)

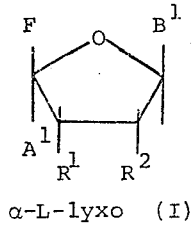

α-L-lyxo (I)

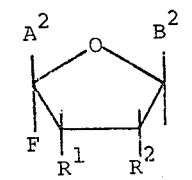

β-D-ribo (II)

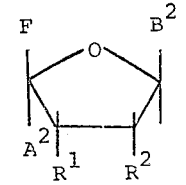

α-L-lyxo (II)

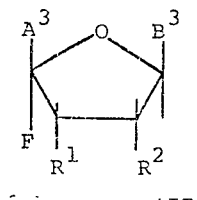

β-D-ribo (III)

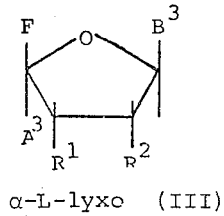

α-L-lyxo (III)

wherein $R^1$ and $R^2$ are independently hydroxy or acyloxy having from 2 through 12 carbon atoms, or $R^1$ and $R^2$ together form the group

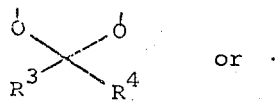

wherein $R^3$ and $R^4$ are independently hydrogen, lower alkyl, aryl or together with the carbon atom to which they are joined form a cycloalkyl group having from 5 through 7 ring carbon atoms; $A^1$ is selected from the group having the formulas: $-CH_2OH$, $-CH_2I$, $-CH_2N_3$, or $-CH_2OPO(OH)_2$; and $B^1$ is a purine base selected from the group: 6-mercaptopurine; 6-lower alkylthiopurine; 2-amino-6-mercaptopurine; 2-amino-6-lower alkylthiopurine; 6-methylaminopurine; 6-dimethylaminopurine; 2-amino-6-methylaminopurine; 2-amino-6-dimethylaminopurine; 6-(1-adamantylamino)purine; hypoxanthine; xanthine; guanine; 8-azaguanine; 7-deazaguanine; adenine; 2-fluoroadenine; 2-chloroadenine; 2-azadenine; 7-deazaadenine; 8-aza-9-deazaadenine; 7-deaza-7-cyanoadenine; 8-azaadenine and;or $B^1$ is a pyrimidine base selected from the group cytosine, 5-fluorocytosine, 5-chlorocytosine, 5-bromocytosine, 5-iodocytosine, 5-lower alkyl cytosine, 5-trifluoromethylcytosine, 5-hydroxymethylcytosine, 5-nitrocytosine, 5-azacytosine, 6-azacytosine, 5-methyl-6-azacytosine, 2-thiocytosine, uracil, 5-fluorouracil, 5-chlorouracil, 5-bromouracil, 5-iodouracil, 5-lower alkyluracil, 5-trifluorouracil, 5-hydroxymethyluracil, 5-nitrouracil, 5-azauracil, 6-azauracil, 5-methyl-6-azauracil, 2-thiouracil, 4-thiouracil, 2,4-dithiouracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one; 4-hydroxylamino-5-bromo-pyrimidin-2-one; 4-hydroxylamino-5-chloro-pyrimidin-2-one; 4-hydroxylamino-5-iodo-pyrimidin-2-one; 4-hydroxylamino-5-lower alkyl-pyrimidin-2-one; 4-hydroxylamino-5-trifluoromethyl-pyrimidin-2-one; 4-hydroxylamino-5-hydroxymethyl-pyrimidin-2-one; 4-hydroxylamino-5-nitro-pyrimidin-2-one; 4-hydroxylamino-5-aza-pyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; and 4-hydroxylamino-pyrimidine-2-thione; $A^2$ is selected from the group having the formulas: $-CH_3$ and $-CH_2NH_2$; and $B^2$ is a purine base selected from the group: 6-methylaminopurine; 6-dimethylaminopurine; 2-amino-6-methylaminopurine; 2-amino-6-dimethylaminopurine; 6-(1-adamantylamino)purine; hypoxanthine; xanthine; guanine; 8-azaguanine; 7-deazaguanine; adenine; 2-fluoroadenine; 2-chloroadenine; 2-azaadenine; 7-deazaadenine; 8-aza-9-deazaadenine; 7-deaza-7-cyanoadenine; 8-azaadenine; or $B^2$ is a pyrimidine base selected from the group: cytosine, 5-fluorocytosine, 5-chlorocytosine, 5-lower alkyl cytosine, 5-trifluoromethylcytosine, 5-hydroxymethylcytosine, 5-azacytosine, 6-azacytosine, 5-methyl-6-azacytosine, uracil, 5-fluorouracil, 5-chlorouracil, 5-lower alkyluracil, 5-trifluorouracil, 5-hydroxymethyluracil, 5-azauracil, 6-azauracil, 5-methyl-6-azauracil, 5- aminouracil, 5-methylaminouracil,5-dimethylaminouracil, 5-methylaminocytosine, 5-dimethylaminocytosine, 5-aminocytosine, 4-hydroxylamino-5-fluoropyrimidin-2-one; 4-hydroxylamino-5-chloropyrimidin-2-one; 4-hydroxylamino-5-lower alkyl pyrimidin-2-one; 4-hydroxylamino-5-trifluoromethylpyrimidin-2-one; 4-hydroxylamino-5-hydroxymethylpyrimidin-2-one; 4-hydroxylamino-5-azapyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; $A^3$ is selected from the group having the formula

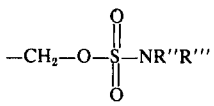

wherein R'' and R''' are independently hydrogen or lower alkyl; and $B^3$ is a purine base selected from the group: 6-mercaptopurine; 6-lower alkylthiopurine; 2-amino-6-mercaptopurine; 2-amino-6-lower alkylthiopurine; 6-methylaminopurine; 6-dimethylaminopurine; 2-amino-6-methylaminopurine; 2-amino-6-dimethylaminopurine; 6-(1-adamantylamino)purine; xanthine; guanine; 8-azaguanine; 7-deazaguanine; 2-fluoroadenine; 2-chloroadenine; 2-aza-adenine; 7-deazaadenine; 8-aza-9-deazaadenine; 7-deaza-7-cyanoadenine; and 8-azaadenine; or $B^3$ is a pyrimidine base selected from the group of pyrimidine bases as defined hereinabove with respect to $B^1$.

The above definitions will be retained throughout and will not be repeated. Further as used hereinabove and below the following terms have the following meanings. The term acyloxy refers to unsubstituted and halo-substituted acyloxy groups having from 2 through 12 carbon atoms typical acyloxy group, expressed as the ester include, for example, acetate, trifluoroacetate, propionate, butyrate, valerate, caproate, enanthate, benzoate, toluylate and the like and simple substituted aryloxy groups such as p-chlorobenzoyloxy; p-nitrobenzoyloxy and the like. The term lower alkyl refers to alkyl groups having from 1 through 6 carbon atoms and includes both branched and straight chained groups. The term aryl refers to aryl groups having from 6 through 12 carbon atoms. Typical aryl groups include, for example, phenyl, tolyl, naphthyl and the like.

Also encompassed within the compounds of the present invention are the pharmaceutically acceptable salts thereof. Typically, the cation salts are replacement salts of one or more of the protonic hydrogens of the phosphate groups, of the compounds of Formula I, with the desired pharmaceutically acceptable cation or cations. The term pharmaceutically acceptable cations refers to pharmaceutically acceptable cations conventionally used in the pharmaceutical art such as, for example, sodium, potassium, triethylammonium, cyclohexylammonium, tributylammonium and the like. The anion salts are typically salts of neutralization of the free amino groups. The term pharmaceutically acceptable anions conventionally used in the art such as, for example, derived from inorganic acids such as, for example, hydrochloric, hydrobromic, hydroiodic, sulfuric, phosphoric, trifluoroacetic acids and the like. The preferred anion is chloride.

Typical examples of the compounds of Formula I wherein $A^1$ is the group —$CH_2OH$ can, for example, be had by reference to Examples 8, 8a, and 9.

Typical examples of the compounds of Formula I wherein $A^1$ is the group —$CH_2I$ can, for example, be had by reference to Example 4 hereinbelow.

Typical examples of the compounds of Formula I wherein $A^1$ is the group —$CH_2OPO(OH)_2$ can, for example, be had by reference to Example 13 hereinbelow.

The preferred compounds of formula I are those wherein $R^1$ and $R^2$ are independently hydroxy or benzoyloxy or together form an isopropylidene group, and $B^1$ is selected from the group: 6-(1-adamantylamino)-purine; adenine; 2-fluoroadenine; 8-aza-9-deazaadenine; 7-deaza-7-cyanoadenine; 8-azaadenine; cytosine, 5-fluorocytosine, 5-iodocytosine, 5-lower alkyl cytosine, 5-trifluoromethylcytosine; 5-hydroxymethylcytosine; 5-azacytosine; 6-azacytosine; 2-thiocytosine; uracil; 5-fluorouracil; 5-iodouracil; 5-lower alkyluracil; 5-azauracil; 6-azauracil; 4-hydroxylamino-5-fluoropyrimidin-2-one; 4-hydroxylamino-5-lower alkyl-pyrimidin-2-one; 4-hydroxylamino-5-trifluoromethyl-pyrimidin-2-one; 4-hydroxylamino-5-aza-pyrimidin-2-one; 4-hydroxylamino-6-aza-pyrimidine-2-one; 4-hydroxylaminopyrimidin-2-one; 4-hydroxylamino-pyrimidin-2-thione; 6-mercaptopurine; 6-lower alkylthiopurine; and 7-deazaadenine.

Typical examples of the compounds of Formula II wherein $A^2$ is —$CH_3$ can, for example, be had by reference to Example 5 hereinbelow.

Typical examples of the compounds of Formula II wherein $A^2$ is —$CH_2NH_2$ can, for example, be had by reference to Example 7 hereinbelow.

The preferred compounds of Formula II are those wherein $R^1$ and $R^2$ are independently hydroxy or benzoyloxy or together form an isopropylidene group, and $B^2$ is selected from the group: 6-(1-adamantylamino)-purine; adenine; 2-fluoroadenine; 8aza-9-deazaadenine; b 7-deaza-7-cyano-adenine; b 8-azaadenine; cytosine, 5-fluorocytosine, 5-chlorocytosine, 5-lower alkyl cytosine; 5-trifluoromethylcytosine; 5-hydroxymethylcytosine; 5-azacytosine, 6-azacytosine; uracil, 5-fluorouracil; 5-chlorouracil; 5-lower alkyluracil; 5-azauracil, 6-azauracil; 4-hydroxylamino-5-fluoropyrimidin-2-one; 4-hydroxyamino-5-lower alkyl-pyrimidin-2-one; 4-hydroxylamino-5-trifluoromethyl-pyrimidin-2-one; 4-hydroxylamino-5-aza-pyrimidin-2-one; 4-hydroxylamino-6-aza-pyrimidin-2-one; 4-hydroxylaminopyrimidin-2-one; and 7-deazaadenine.

Typical examples of the compounds of Formula III wherein $A^3$ is the group

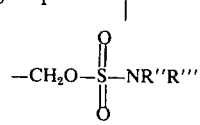

can, for example, be had by reference to Examples 10, 10a, 11 and 12 hereinbelow. The preferred compounds of Formula III are those wherein $R^1$ and $R^2$ are independently hydroxy or benzoyloxy or together form an isopropylidene group, R'' and R''' are independently hydrogen or methyl and $B^3$ is selected from the group: 6-(1-adamantylamino)purine; 6-mercaptopurine; 2-fluoroadenine; 8-aza-9-deazaadenine; 7-deaza-7-cyanoadenine; 8-azaadenine; cytosine; 5-fluorocytosine; 5-iodocytosine; 5-lower alkylcytosine; 5-trifluoromethylcytosine; 5-hydroxymethylcytosine; 5-azacytosine; 6-azacytosine; 2-thiocytosine; uracil; 5-fluorouracil; 5-iodouracil; 5-lower alkyluracil; 5-azauracil; 61-azauracil; 4-hydroxylamino-5-fluoropyrimidin-2-one; 4-hydroxylamino-5-lower alkylpyrimidin-2-one; 4-hydroxylamino-5-trifluoromethyl pyrimidin-2-one; 4-hydroxylamino-5-aza-pyrimidin-2-one; 4-hydroxylamino-6-aza-pyrimidin-2-one; 4-hydroxylamino-pyrimidin-2-one; 4-hydroxylamino-pyrimidin-2-thione; and 7-deazaadenine.

In summary, the process of the present invention for preparing 4'-fluoro nucleosides comprises treating the corresponding 4',5'-unsaturated nucleoside with iodine monofluoride to form the corresponding 5'-deoxy-4'-fluoro-5'-iodo nucleoside. The 5'-deoxy-4'-fluoro-5'-iodo-nucleoside can then be converted to the corresponding 5'-azido-5'-deoxy-4'-fluoro nucleoside by nucleophilic displacement. Various derivatives can then be prepared from either the 5'-iodo or 5'-azido nucleosides according to procedures which are described hereinbelow.

The novel process of the present invention, including steps for preparing the 4',5'-unsaturated nucleoside, can be schematically represented by the following overall reaction equations:

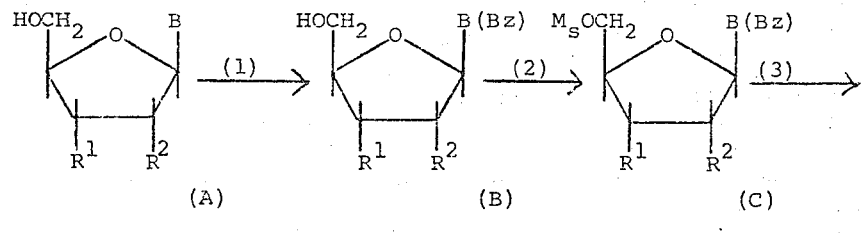

(A)     (B)     (C)

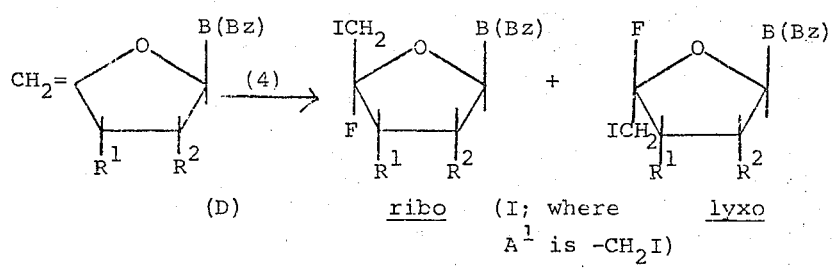

(D)     ribo (I; where $A^1$ is $-CH_2I$)     lyxo wherein Ms is a mesyl radical

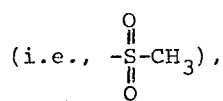

Bz is benzoyl, or acetyl, and B is a purine or pyrimidine base moiety as defined above with respect to $B^1-B^3$.

In Step 1 of the reaction sequence, the free amino group or groups, if any, in the purine or pyrimidine base moiety are protected. This can be conveniently effected by treating the purine nucleosides of Formula A with benzoyl chloride in a suitable inert organic solvent and in a suitable base. Typically the treatment is conducted at temperatures in the range of about from 0° to 35°C for about from 6 to 24 hours. Preferably the reaction is conducted in the absence of light, or at least under diminished lighting, and preferably a 50 to 200% stoichiometric excess of benzoyl chloride is used. Suitable inert organic solvent and base mixtures which can be used include, for example; pyridine and dimethylformamide; 1,5-diazabicyclo[4.3.0]non-5-ene and dimethylformamide; diisopropylethylamine and dimethylformamide; triethylamine and dimethylformamide; and the like. Also pyridine can be used alone serving as both the solvent and base; and this represents the presently preferred technique. Also, although good results are typically obtained with benzoyl chloride, the following compounds can also be used, toluyl chloride, acetic anhydride, benzoic anhydride, and the like, to yield the corresponding acyl protecting group. In a similar manner, guanosine -O-isopropylidene-βas the $N^2$-acetyl derivatives. Cytosine nucleoside derivatives are protected by treatment with acetic anhydride in refluxing methanol or ethanol for 5 hours. Benzoic anhydride can also be used.

The compounds of Formula A are known compounds or can be prepared from the corresponding 2',3'-unprotected nucleosides by known procedures. Also, we have found that good results are obtained by using 2',3'-O-alkylidene (preferably 2',3'-O-isopropylidene) protected nucleosides. The 2',3'-O-isopropylidene nucleosides of Formula A can, for example, be conveniently prepared from the corresponding unprotected compounds by the procedures described by Hampton in Jour. Am. Chem. Soc., v. 83, 3640 (1961).

Step 2, mesylation of the 5'-hydroxy group, can be conveniently effected by treating the nucleoside of Formula B with methanesulfonyl chloride in a suitable inert organic solvent base. Typically this treatment is conducted at temperatures in the range of about from 0° to 35°C for about from 6 to 24 hours. Preferably a slight excess of methanesulfonyl chloride is used. Suitable solvent base mixtures which can be used include, for example, pyridine and dimethylformamide, 1,5-diazabicyclo[4.3.0]non-5-ene and dimethylacetamide, dimethylacetamide and diisopropylethylamine, and the like and pyridine alone. Again good results are typically obtained using pyridine alone. Also in place of the preferred methanesulfonyl chloride, the following reagents can also be used: p-toluenesulfonyl chloride, benzenesulfonyl chloride, p-bromobenzenesulfonyl chloride, and the like.

Step 3, is effected, according to the present invention, by treating the 5'-O-mesyl nucleosides of Formula C with resublimed potassium t-butoxide in a suitable inert organic solvent. Typically this treatment is conducted at temperatures in the range of about from −10° to 25°C for about from ½ to 2 hours. Preferably an excess of potassium t-butoxide is used. This step of the treatment should be conducted under anhydrous conditions and with vigorous agitation. The mixture is then treated with a buffered acid solution such as, for example, an aqueous solution of sodium acetate and acetic acid, typically at temperatures in the range of about from 0° to 5°C for about from ½ to 1 hour. Preferably, the reaction mixture is also vigorously agitated during this step of the treatment. Suitable inert organic solvents which can be used for the potassium t-butoxide step of the treatment include, for example, tetrahydrofuran, dimethylformamide, dimethyl sulfoxide, and dimethylacetamide. For reason of stability one additional benzoyl group is introduced at the $N^1$ position of the adenosine derivative by treatment with benzoyl chloride in pyridine.

Step 4, the preparation of the 5'-deoxy-4'-fluoro-5'-iodo nucleosides of Formula I of this invention can be prepared by treating the corresponding compounds of Formula D with silver monofluoride and iodine in an inert organic solvent. Typically this treatment is conducted at temperatures in the range of about from −80° to 35°C, for about from 1 to 2 hours. Typically mole ratios in the range of about from 5 to 20 moles of silver monofluoride and about from 5 to 20 moles of iodine are used, per mole of nucleoside starting material (Formula D). The reaction mixture should be agitated during the treatment and preferably vigorously. Suitable inert organic solvents which can be used include, for example, benzene, dichloromethane, tetrahydrofuran, dioxane, acetonitrile, nitromethane and the like; however, benzene is presently preferred.

The 5'-deoxy nucleosides of Formula II ($A^2$ is —$CH_3$), are prepared according to steps 5 and 6 from the corresponding nucleosides of Formula I (wherein $A^1$ is —$CH_2I$). This can be represented by the following overall schematic reaction equations:

wherein $B^2$, $R^3$ and $R^4$ are as defined hereinabove, preferably with respect to purine and pyrimidine bases where the free amino groups, if any, of the starting base material are protected with acyl groups having from 2 through 12 carbon atoms, preferably benzoyl.

The 5'-deoxy-4'-fluoro nucleosides are prepared according to step 5 by the reduction of the corresponding 5'-deoxy-4'-fluoro-5'-iodo nucleosides. This reduction can be effected by treating the 5'-iodo nucleosides with gaseous hydrogen in the presence of a suitable catalyst in a suitable inert organic solvent. This treatment is typically conducted by first dissolving the 5'-iodo-nucleosides starting material in a suitable solvent containing a suitable particulate catalyst in suspension, and then vigorously stirring this suspension under a gaseous hydrogen atmosphere. Typically, this treatment is conducted at temperatures in the range of about 15° to 35°C for about 1 to 24 hours and then preferably conducted under pressures in the range of about 1 to 10 atmospheres. Good results are obtained using a particulate palladium impregnated barium sulfate catalyst; however, other catalysts which can be used include, for example, palladium impregnated charcoal and the like. Suitable solvents which can be used include, for example, ethyl acetate, methanol, ethanol and the like.

The 2',3'-O-alkylidene protecting group can be removed by acid hydrolysis (step 6). This can be conveniently effected by treating the resulting product of the above step with aqueous formic acid or trifluoroacetic acid at a temperature in the range of about 15° to 37°C for about 0.5 to 24 hours. Where base moieties having free amino groups protected with benzoyl groups are used, such benzoyl protecting groups can be removed by base hydrolysis. This can be conveniently effected by treating the above product with a mixture of ammonium hydroxide and methanol, or other suitable inert organic solvents, at temperatures in the range of about 15° to 40°C for about 1 to 36 hours.

The 5'-amino nucleosides of Formula II ($A^2$ is —$CH_2NH_2$) can be prepared via a 5'-azido nucleoside intermediate. This intermediate can be prepared from the corresponding 5'-iodo nucleosides of Formula I ($A^1$ is —$CH_2I$) via step 7. Step 7 and subsequent step 8 can be represented by the following overall schematic reaction equations:

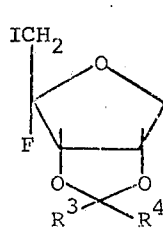
(IV)

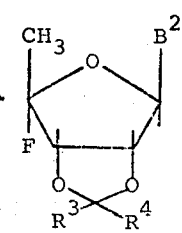
(II; $A^2$ is —$CH_3$)

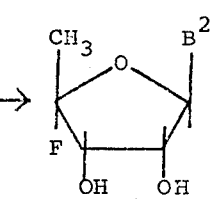
(II; $A^2$ is —$CH_3$)

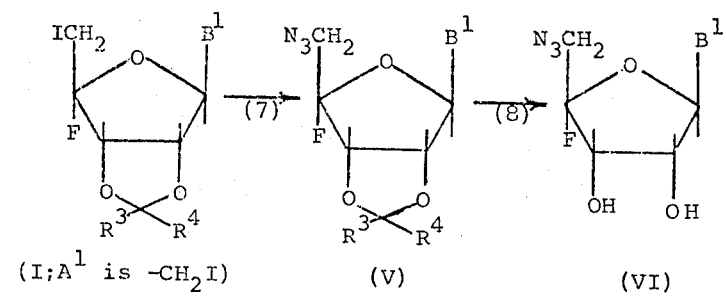
(I; $A^1$ is —$CH_2I$)     (V)     (VI)

wherein B¹ is as defined hereinabove, preferably with respect to purine and pyrimidine bases where the free amino groups, if any, of the starting base material are protected with acyl groups having from 2 through 12 carbon atoms, preferably benzoyl.

Step 7 can be effected by treating the corresponding 2',-3'-O-alkylidene protected 5'-iodo compounds of Formula I (A¹ is —CH₂I), with lithium azide in a suitable inert organic solvent. This treatment is typically conducted at temperatures in the range of about 80° to 150°C, preferably about 100° to 120°C, for about 12 to 36 hours, preferably about 18 to 24 hours, using a mole ratio of about from 4 to 10 moles of lithium azide per mole of nucleoside starting material. Suitable inert organic solvents which can be used include, for example, dimethylformamide, dimethylacetamide, hexamethylphosphoramide and the like. Although good results are obtained using lithium azide, the following azide compounds could also be used, sodium azide, tetramethylammonium azide and the like. If desired, the 2',3'-O-alkylidene protecting group can be removed by acid hydrolysis (step 8) using the same procedures as described hereinabove with respect to the 5'-deoxy nucleosides. Where the base starting material has benzoyl protecting groups protecting the free amino group and the base moiety, such benzoyl groups can be removed by alkaline hydrolysis. This can be effected by treating the product with a mixture of concentrated ammonium hydroxide and methanol under the same conditions as described above.

The preparation of the 5'-amino nucleosides of Formula II can be represented by the following schematic overall reaction equations:

such as, for example, methanol, preferably containing a suitable catalyst such as, for example, palladium impregnated barium sulfate, in suspension and then stirring this suspension under an atmosphere of hydrogen.

The nucleosides of Formula I (wherein A¹ is —CH₂OH), with the exception of the 4-thiouridine and 2,4-dithiouridine nucleosides can also be prepared from the corresponding 5'-azido nucleosides of Formula V'. This preparation can be represented by the following schematic overall reaction equations:

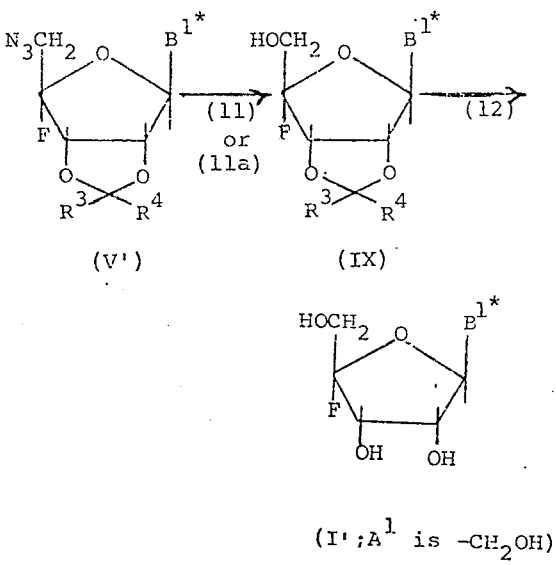

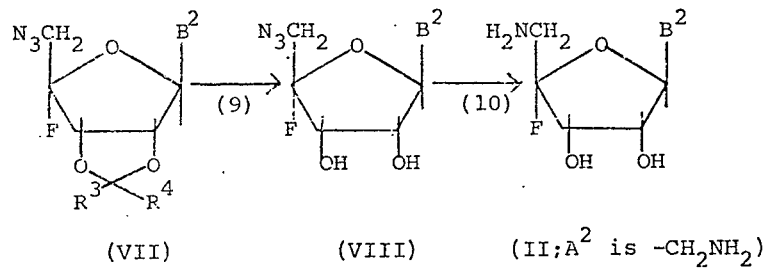

wherein B² is as defined hereinabove, preferably with respect to purine and pyrimidine bases where the free amino groups, if any, of the starting base material are protected with acyl groups having from 2 through 12 carbon atoms, preferably benzoyl.

Step 9, removal of the 2',3'-O-alkylidene protecting group, can be effected by any suitable procedure for removing such group such as, for example, by acid hydrolysis. Removal of the protecting group by acid hydrolysis can be conveniently effected by treating the nucleoside of Formula VII with concentrated aqueous trifluoroacetic acid at temperatures in the range of about 0° to 25°C for about 1 to 10 hours.

Step 10 can be effected by treating the unprotected nucleoside of Formula VIII with gaseous hydrogen in the presence of a suitable catalyst in a suitable inert organic solvent. This treatment can be conveniently effected by dissolving the resulting 2',3'-unprotected-5'-azido product in a suitable inert organic solvent where B¹⁼ is selected from the same group of purine and pyrimidine bases as B¹ with the exception of 4-thiouridine and 2,4-dithiouridine, preferably with respect to the purine and pyrimidine bases where the free amino groups, if any, of the starting base material are protected with acyl groups having from 2 through 12 carbon atoms, preferably benzoyl.

Step 11 can be effected by irradiating the corresponding 5'-azido nucleoside of Formula V', in a suitable inert organic solvent, such as benzene, dioxane, or methanol, with ultraviolet light having a wavelength in the range of about 290 to 330 mμ. Irradiation can be effected by use of any suitable ultraviolet light source and wavelengths shorter than 290 mμ can be conveniently removed by use of a pyrex filter. Typically this treatment is conducted at temperatures in the range of about 0° to 35°C and preferably about 20° to 25°C. Also, because of the wide variation in the factors controlling the effective intensity of the ultraviolet light applied to the reaction mixture, it is preferred that the reaction mixture be actually monitored, and irradiation continued until the desired degree of reaction has occurred, until a representative treatment duration can be obtained. This yields the corresponding 5'-aldehyde nucleosides which can then be reduced to the corresponding 5'-alcohol ($A^1$ is —$CH_2OH$) by any suitable reduction procedure. This reduction can, for example, be conveniently effected by treatment with sodium borohydride in a suitable inert organic solvent (e.g., ethanol) at temperatures in the range of about 15° to 25°C for about 10 to 30 minutes.

The 2',3'-O-alkylidene protecting group can be removed by acid hydrolysis (step 12). This can be conveniently effected via treatment with aqueous formic acid via the procedure described hereinabove with respect to the removal of such protecting group.

Alternatively, the nucleosides of Formula IX can be prepared (according to this step 11a) by treating the 5'-azido-4'-fluoro nucleosides having no amino function on the heterocyclic base moiety with $NOBF_4$ in a solvent, such as acetonitrile, at about −10° to about 20°C for about 5 minutes to one hour. While this technique can be used for all 5'-azido-4'-fluoro nucleosides which do not have an amino function on the base moiety, it is the preferred technique for those nucleosides which do not have such an amino function yet absorb in the 290–330 mμ range, eg, 4-thiouridine and 2,4-dithiouridine.

The 4'-fluoro-5'-sulfamoyl nucleosides of Formula III and also the corresponding 4'-fluoro-5'-sulfamoyl-adenine and hypoxanthine nucleosides, can be prepared from the corresponding 4'-fluoro nucleosides of this invention. The process of preparing these compounds can be represented by the following schematic overall reaction equations:

in a suitable inert organic solvent and suitable molecular sieves. This treatment is typically conducted at temperatures in the range of about 20° to 35°C, for about 36 to 96 hours, preferably about 48 hours, using a mole ratio of about 1 to 5 moles of sulfamoyl chloride or substituted chloride per mole of 4'-fluoro nucleoside starting material in presence of molecular sieves 4A and 500W. Suitable inert organic solvent include dioxane, tetrahydrofuran, and the like. Suitable substituted sulfamoyl chlorides which can be used include, for example, N-methylsulfamoyl chloride; N,N-dimethylsulfamoyl chloride; N-butylsulfamoyl chloride; N,N-dibutylsulfamoyl chloride; and the like.

The 2',3'-O-alkylidene protecting groups can be removed by acid hydrolysis (step 14) according to the same procedures described herein above such as, for example, by treatment with aqueous formic acid. Similarly, acyl protecting groups on the free amino groups of the base moiety can be removed in the same manner as described hereinabove.

Step 13 can also be effected by first treating the corresponding nucleosides of Formula X ($A^1$ is —$CH_2OH$) with bis-(tributyltin)oxide in a suitable inert organic liquid media and then adding sulfamoyl chloride, or the desired substituted sulfamoyl chloride, dissolved in a suitable inert organic solvent such as, for example, dioxane. This bis-(tributyltin)oxide treatment is typically conducted at the reflux temperature of the system with continuous azeotropic removal of the water by-product formed by the treatment. This treatment is typically continued for a duration of about 1 to 3 hours. Suitable inert organic liquid media which can be used include, for example, benzene, toluene, xylene and the like. The treatment with sulfamoyl chloride is typically conducted after completion of the bis-(tributyltin)oxide treatment, by dissolving the sulfamoyl chloride, or

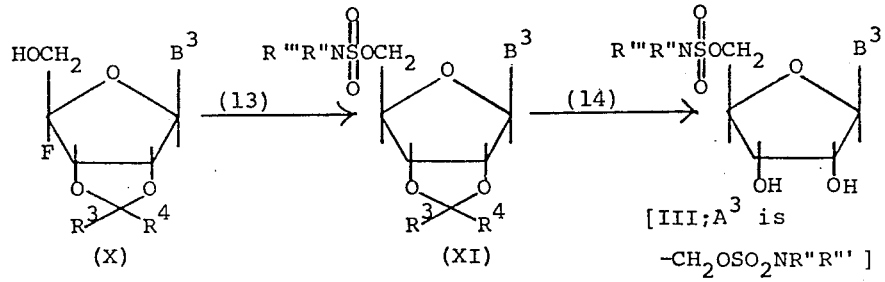

(X)        (XI)        [III; $A^3$ is —$CH_2OSO_2NR''R'''$ ]

wherein R'', R''', $R^3$ and $R^4$ are as defined above, and $B^3$ is as defined above, preferably with respect to the purine and pyrimidine bases where the free amino groups, if any, of the starting base material are protected with acyl groups having from 2 through 12 carbon atoms, preferably benzoyl.

Step 13 can be effected by treating the corresponding 2',3'-O-protected nucleosides of Formula X ($A^3$ is —$CH_2OH$) with sulfamoyl chloride

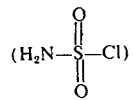

or the desired R'', R''' substituted sulfamoyl chloride

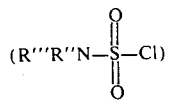

substituted sulfamoyl chloride, in a suitable inert organic solvent such as, for example, dioxane, and then adding this solution directly to the bis-(tributyltin)oxide reaction mixture. This treatment is typically conducted at temperatures in the range of about 0° to 20°C for about 30 to 90 minutes. Suitable substituted sulfamoyl chlorides which can be used include, for example N-methylsulfamoyl chloride; N,N-dimethylsulfamoyl chloride; N-butylsulfamoyl chloride; N,N-dibutylsulfamoyl chloride; and the like.

Alternatively, a number of the 4'-fluoro-5'-O-sulfamoyl nucleosides of Formula XI, can be prepared by the slightly more complex two-step process of steps 15 and 16. In the first step of this alternative procedure, the corresponding 4'-fluoro-2',3'-O-alkylidene-nucleoside of Formula X ($A^1$ is —$CH_2OH$) of this invention, is treated with sodium hydride, in a suitable inert organic solvent. This step is typically conducted at temperatures in the range of about 0° to 20°C for about 1 to 4 hours. After this step 15 has been completed, sulfamoyl chloride is added in step 16 to the reaction mixture. Step 16 is typically conducted at temperatures in the range of about −10° to 30°C and preferably about 0° to 5°C for about 2 to 48 hours and preferably about 18 to 24 hours using a mole ratio of about 1 to 5 moles of sulfamoyl chloride per mole of nucleoside starting material.

The 5′-phosphate of Formula I [A¹ is —CH₂OPO(OH)₂] can be prepared from the corresponding nucleosides of Formula I (where A¹ is —CH₂OH). The process of preparing these compounds can be represented by the following overall reaction equations:

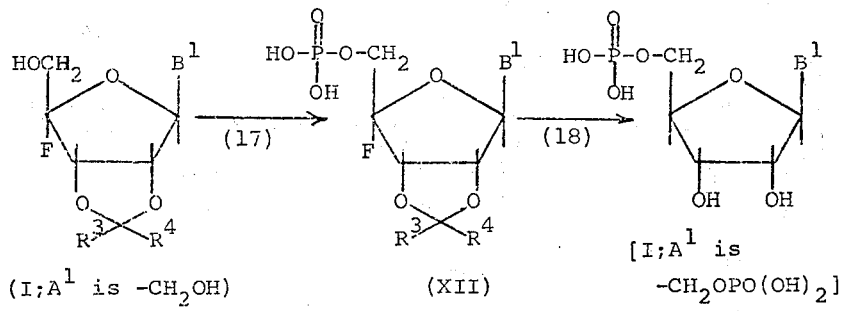

wherein R³ and R⁴ are as defined above, and B¹ is as defined above, preferably with respect to the purine and pyrimidine bases where the free amino groups, if any, of the starting base material are protected with acyl groups having from 2 through 12 carbon atoms, preferably benzoyl or acetyl.

Step 17 can be effected by any suitable procedure for phosphorylating nucleosides having 5′-OH groups such as, for example, via treatment with cyanoethyl phosphate and dicyclohexylcarbodiimide in anhydrous pyridine, followed by treatment with sodium hydroxide — according to the general procedure described by Tener in J.A.C.S. 83, 159 (1961). The protecting groups can then be removed by acid hydrolysis, as described above.

The combination of steps 17 and 18 can also be conveniently effected via treatment with bis(trichloroethyl)phosphate and p-toluenesulfonic acid in a suitable solvent, such as pyridine. This treatment is typically conducted at about 15° to 25°C for about 16 to 24 hours. After this treatment is completed the excess reagent is destroyed with water and sodium bicarbonate. The protecting group (at the 2′ and 3′ positions) is removed by 90% formic acid treatment at 15°–25°C for the phosphate moiety is removed by zinc dust and acetic acid treatment at 15°–25°C for 30 minutes to 3 hours.

The 5-amino-4′-fluorouridine and 5-amino-4′-fluorocytidine nucleosides of Formula I, (A¹ is —CH₂OH) can be prepared from the corresponding 5-nitrouridine or 5-nitrocytidine, respectively, nucleosides of Formula I (A¹ is —CH₂OH), by treating the 5-nitrouridine or 5-nitrocytidine compounds of Formula I (A¹ is —CH₂OH and preferably R¹ and R² are each hydroxy) with gaseous hydrogen in the presence of a suitable hydrogenation catalyst, such as, for example, palladium impregnated charcoal, in a suitable inert organic solvent. This treatment is conducted by first dissolving the corresponding 5-nitrouridine or 5-nitrocytidine nucleoside in a suitable solvent containing a suspension of the hydrogenation catalyst and then keeping the suspension under a layer of gaseous hydrogen with vigorous stirring. Typically, this treatment is conducted at temperatures in the range of about from 15° to 35°C and preferably about from 20° to 35°C for about from 2 to 24 hours and preferably about from 3 to 6 hours.

The pyrimidin-2-one nucleoside derivatives of Formula I (A¹ is —CH₂OH) can be prepared by treating the corresponding cytosine, and substituted cytosine, nucleosides of Formula I (A¹ is —CH₂OH and R¹ and R² together form isopropylidene) with an aqueous solution of hydroxylamine.hydrochloride (NH₂OH.HCl). Typically this treatment is conducted at temperatures in the range of about from 15° to 35°C, and preferably about from 20° to 25°C, for about from 1 to 60 days and preferably about from 3 to 20 days. Typically about a 18 to 25% by weight hydroxylamine.hydrochloride aqueous solution will be used. Sufficient solution to provide a mole ratio of about 2 to 5 moles of NH₂OH.HCl per mole of nucleoside starting material is used. Also in place of water, solvents such as dimethylformamide, dimethyl sulfoxide or hexamethylphosphoramide and the like could be used.

Although the above overall reaction equations have been shown, for purposes of simplicity, with respect to the β-D-ribo isomers, it should be understood that the processes are also applicable with respect to the α-L-lyxo isomers and to epimer mixtures of the β-D-ribo and α-L-lyxo isomers.

In a further aspect, the present invention also relates to 2′-deoxy-4′-fluoro nucleosides represented by the following formulas:

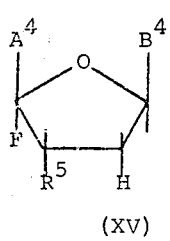

(XV)

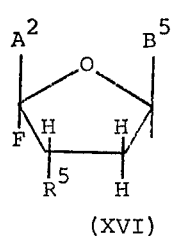

(XVI)

where $A^4$ is $-CH_2OH$, $-CH_2I$, $-CH_2N_3$, $-CH_2OPO(OH)_2$ or

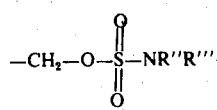

where $R''$ and $R'''$ are as defined above; $B^4$ is a pyrimidine base selected from the group: cytosine, 5-fluorocytosine, 5-chlorocytosine, 5-bromocytosine, 5-iodocytosine, uracil, 5-fluorouracil, 5-chlorouracil, 5-bromouracil, 5-iodouracil, and 5-lower alkyluracil; $R^5$ is hydroxy or an acyloxy group having from 2 through 12 carbon atoms; $A^2$ is as defined above; and $B^5$ is cytosine, 5-fluorocytosine, 5-chlorocytosine, uracil, 5-fluorouracil, 5-chlorouracil, and 5-lower alkyl uracil.

The method of preparing the compounds of Formula XV can be represented by the follwoing overall reaction equations:

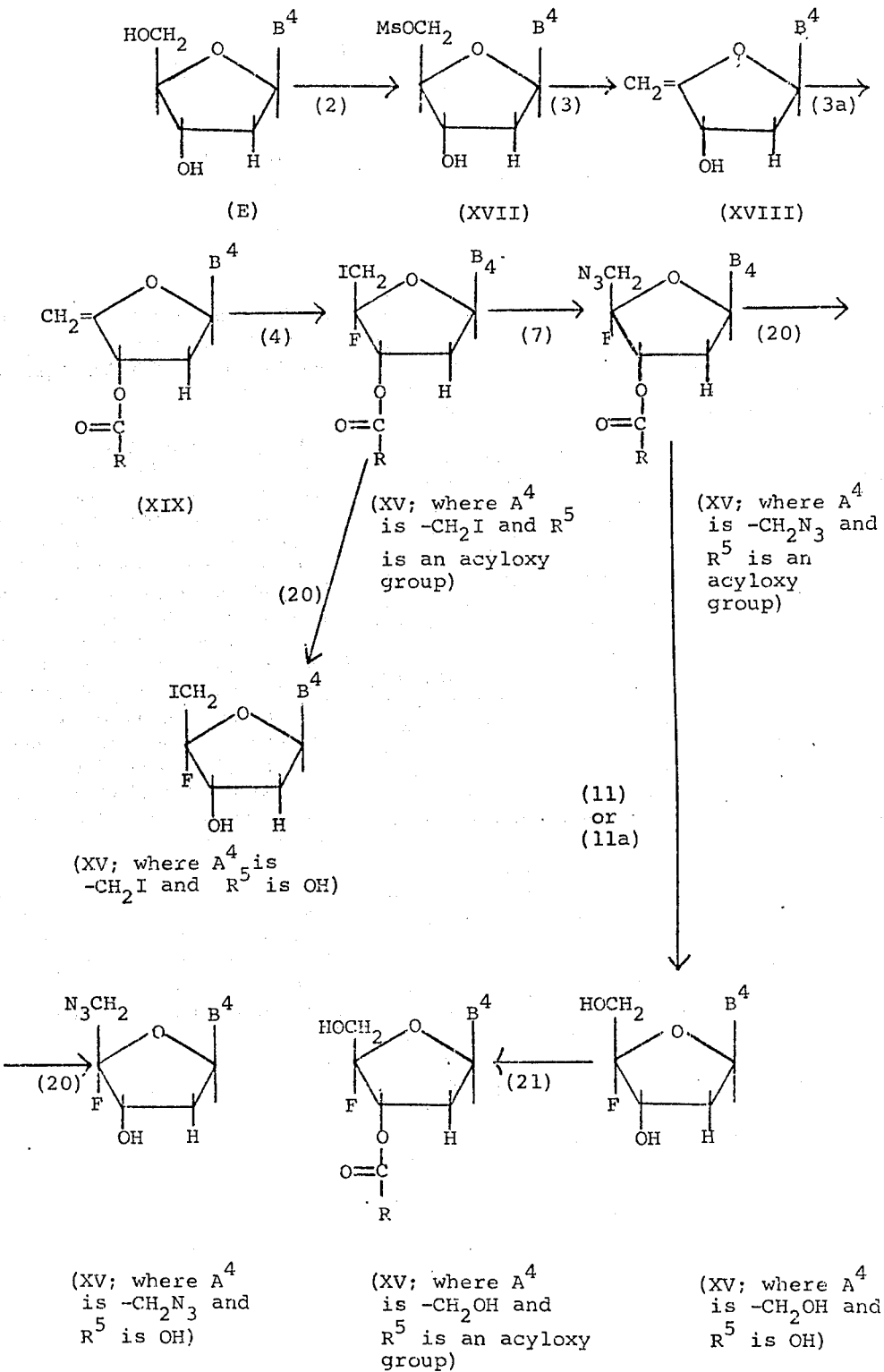

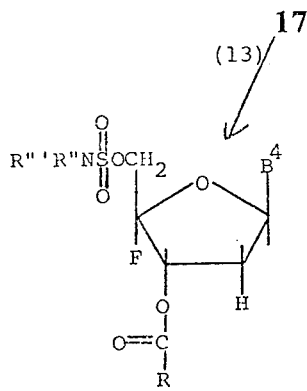

(XV; where $A^4$ is $-CH_2OSO_2NR''R'''$ and $R^5$ is an acyloxy group)

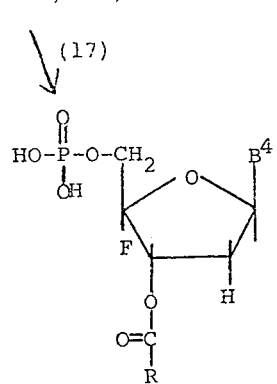

[XV; where $A^4$ is $-CH_2OPO(OH)_2$ and $R^5$ is an acyloxy group]

↓ (20)

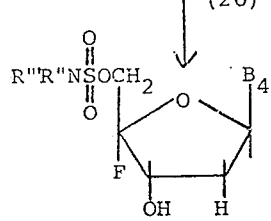

(XV; where $A^4$ is $-CH_2OSO_2NR''R'''$ and $R^5$ is OH)

↓ (20)

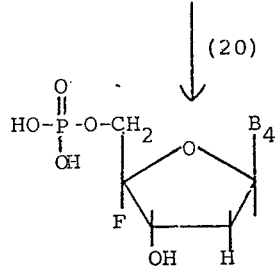

[XV; where $A^4$ is $-CH_2OPO(OH)_2$ and $R^5$ is an acyloxy group]

The method of preparing the compounds of Formula XVI can be represented by the following overall reaction equations:

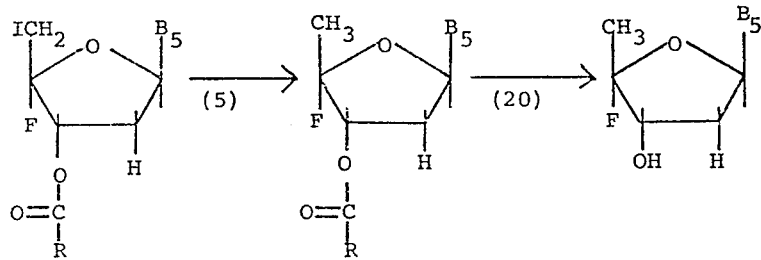

(XV; where $A^4$ is $-CH_2I$ and $R^5$ is an acyloxy group)

(XVI; where $A^2$ is $-CH_3$ and $R^5$ is an acyloxy group)

(XVI; where $A^2$ is $-CH_3$ and $R^5$ is OH)

and

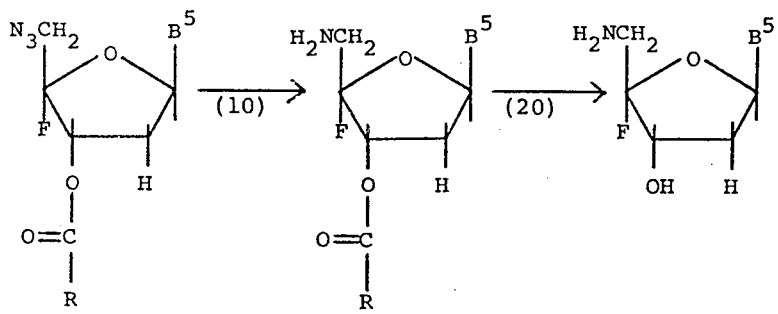

(XV; where $A^4$ is $-CH_2N_3$ and $R^5$ is an acyloxy group)

(XVI; where $A^2$ is $-CH_2NH_2$ and $R^5$ is an acyloxy group)

(XVI; where $A^2$ is $-CH_2NH_2$ and $R^5$ is OH)

The starting materials in these two reaction sequences are Formula XV compounds where $A^4$ is either $-CH_2I$ or $-CH_2N_3$ and $B^4$ is limited to the $B^5$ base moieties.

In the above schematic reaction sequences, steps 2, 3, 4, 5, 7, 10, 11 or 11a, 13, and 17 can be conducted utilizing reactants, solvents, reaction conditions, etc. as described hereinabove with regard to the preparation of the compounds of Formulas I–III, V, VI, IX, XI and XII. However, only the first described embodiment of Step 13 is applicable to produce the compound of Formula XV identified above.

The compounds of Formula E where $B^4$ is as defined above are well known compounds which can be prepared according to procedures known to those skilled in this art.

Step 3a can be conveniently effected by reacting the compound of Formula XVIII with a suitable carboxylic acid anhydride; such as $(CF_3CO)_2O$ in a suitable solvent, such as pyridine, for about 10 to about 20 hours at about 15° to about 25°C.

Each step 20, a base hydrolysis step, can be conveniently effected by treating the particular compound of Formula XV or XVI as specified in the reaction sequences above with, for example, a one to one mixture of concentrated ammonium hydroxide and methanol at a temperature in the range of about 15° to about 40°C for about 1 to about 24 hours.

Step 21 can be conveniently effected by treating the compound of Formula XV (where $A^4$ is $-CH_2OH$ and $R^5$ is $-OH$) with 1.1 equivalent of mono-p-methoxytrityl chloride for about 18 to 25 hours at about 15° to 25°C. 5 equivalents of acetic anhydride are then added to the reaction mixture which is held at about 15° to 25°C for about 18 to 25 hours. The reaction mixture is then evaporated to dryness. The residue is dissolved in 90% formic acid for about ½ to 2 hours at about 15° to 25°C.

It is preferred that each of the respective intermediates and products formed by the above reaction steps is isolated prior to its use as starting materials for the next succeeding steps. Separation and isolation of the intermediates and products can be effected by any suitable separation or purification procedure such as, for example, crystallization, column chromatography, thin-layer chromatography, etc. Specific illustrations of typical separation and isolation procedures can be had by reference to the examples described hereinbelow. However, other equivalent separation or isolation procedures could, of course, also be used.

Other pharmaceutically acceptable salts of the 5'-phosphate nucleosides of Formula I can, for example, be conveniently prepared from the barium phosphate salts (note Example 13) via cation exchange with a suitable ion exchange resin in the desired cation form. Pharmaceutically acceptable salts of the free amino groups can be prepared via neutralization of the free amino group with the desired acid.

The compounds of Formulas I, II, III, XV and XVI exhibit general antimetabolite activity in mammals and are also intermediates, as shown in the above processes, for other compounds of our invention and also for Nucleocidin. The compounds are thus useful for producing metabolic deficiencies in undesired biological systems, or for inhibiting such systems. The compounds can also be used to sterilize medical and laboratory instruments where more conventional sterilization agents have proved ineffective.

In addition, nucleosides of Formula III are analogs of the known antibiotic nucleoside Nucleocidin (note Merck Index, Eighth Ed., Edt. Stecher, p. 752 (1968) and U.S. Pat. No. 2,914,525) and exhibit strong tripanocidal and antibacterial activity and are further useful as inhibitors of protein synthesis in mammals.

5'-Deoxy compounds of Formula II ($A^2$ is $-CH_3$) have further utility in the control and examination of enzymatic systems. Purine compounds of Formula II ($A^2$ is $-CH_2NH_2$) also exhibit antiviral activity. Compounds of Formula I [$A^1$ is $-CH_2OPO(OH)_2$] also exhibit pharmacological effects with respect to the blood of mammals -- such as, for example, inhibiting platelet aggregation.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

EXAMPLE 1

This Example illustrates methods of protecting free amino groups in the purine base moiety of the 2',3'-O-isopropylidene purine nucleoside starting materials. In this Example, 6 mmoles of 2',3'-O-isopropylidene-adenosine is dissolved in 25 ml. of pyridine and 30 mmoles of benzoylchloride is then added. The reaction mixture is then stirred in the absence of light for 9 hours, and then poured over ice resulting in a precipitate which is extracted with chloroform. The chloroform extract is then washed with an aqueous saturated solution of sodium bicarbonate, then water, and then dried over sodium sulfate and evaporated to dryness under vacuum. The resulting residue is thoroughly dried, dissolved in 80 ml. of pyridine, and 80 ml. of 1 Normal aqueous sodium hydroxide is then added. The resulting mixture is then cooled to 5°C, then stirred for 10 minutes and neutralized by the addition of 8 ml. of glacial acetic acid. The neutralized mixture is then evaporated under vacuum and the resulting residue partitioned between water and chloroform. The chloroform phase is washed with saturated aqueous sodium bicarbonate, then water, and then dried and evaporated under vacuum, affording a residual syrup which is purified by crystallization using acetone and hexane, yielding pure 2',3'-O-isopropylidene-$N^1,N^6$-dibenzoyl adenosine. By following the same procedure as above using the corresponding 2',3'-O-isopropylidene purine nucleoside as starting materials, the following compounds are respectively prepared:

2',3'-O-isopropylidene-$N^6$-benzoyl-2-fluoroadenosine;

2',3'-O-isopropylidene-$N^6$-benzoyl-2-chloroadenosine;

2',3'-O-isopropylidene-$N^6$-benzoyl-2-azaadenosine;

2',3'-O-isopropylidene-$N^6$-benzoyl-8-azaadenosine;

2',3'-O-isopropylidene-$N^6$-benzoyl-8-aza-9-deazaadenosine;

2',3'-O-isopropylidene-$N^6$-benzoyl-7-deazaadenosine;

2',3'-O-isopropylidene-$N^6$-benzoyl-7-deaza-7-cyanoadenosine;

N-benzoyl-9-(2,3O-isopropylidene-$\beta$-D-ribofuranosyl)-6-methylaminopurine; and N-benzoyl-9-(2,3-O-isopropylidene-$\beta$-D-ribofuranosyl)-6-(1-adamantylamino)purine.

By following the same procedure as above except that benzoyl chloride is replaced by acetic anhydride, the following $N^2$-acetyl guanosine derivatives and analogs are prepared:

2',3'-O-isopropylidene-$N^2$-acetyl-guanosine;

2',3'-O-isopropylidene-$N^2$-acetyl-8-azaguanosine;

2',3'-O-isopropylidene-N²-acetyl-7-deazaguanosine;
9-(2,3-O-isopropylidene-β-D-ribofuranosyl)-2-acetamido-6-mercaptopurine;
9-(2,3-O-isopropylidene-β-D-ribofuranosyl)-2-acetamido-6-methylthiopurine;
N-benzoyl-9-(2,3-O-isopropylidene-β-D-ribofuranosyl)-2-acetamido-6-methylaminopurine; and
9-(2,3-O-isopropylidene-β-D-ribofuranosyl)-2-acetamido-6-dimethylaminopurine.

EXAMPLE 1a

This Example illustrates methods of protecting free amino groups in the cytidine base moiety of the 2',3'-O-isopropylidene cytidine nucleoside derivatives and 2'-deoxy-cytidine nucleoside derivatives used as starting materials. In this Example to a stirred, refluxing solution of 2 mmole of 2',3'-O-isopropylidene cytidine in 50 ml. of dry ethanol is added 500 mg. of acetic anhydride. During the course of refluxing, five further additions of 500 mg. portions of the anhydride are made hourly. After the final addition, the solution is refluxed for 1 hour. The solution is cooled and concentrated. The crystals of $N^4$-acetyl 2',3'-O-isopropylidene cytidine are removed by filtration and washed with ether and dried under vacuum. By following the same procedure as above but using the following cytidine derivatives:
  2',3'-O-isopropylidine-5-hydroxymethylcytidine;
  2',3'-O-isopropylidene-5-fluorocytidine;
  2',3'-O-isopropylidine-5-chlorocytidine;
  2',3'-O-isopropylidine-5-bromocytidine;
  2',3'-O-isopropylidine-5-iodocytidine;
  2',3'-O-isopropylidine-5-methylcytidine;
  2',3'-O-isopropylidine-5-butylcytidine;
  2',3'-O-isopropylidine-5-trifluoromethylcytidine;
  2',3'-O-isopropylidine-5-nitrocytidine;
  2',3'-O-isopropylidine-5-azacytidine;
  2',3'-O-isopropylidine-6-azacytidine;
  2',3'-O-isopropylidine-6-aza-5-methylcytidine;
  2',3'-O-isopropylidine-6-aza-5-butylcytidine;
  2',3'-O-isopropylidine-2-thiocytidine;
  2',3'-O-isopropylidine-5-aminocytidine;
  2',3'-O-isopropylidine-5-methylaminocytidine;
  2',3'-O-isopropylidine-5-dimethylaminocytidine;
  2'-deoxycytidine;
  2'-deoxy-5-fluorocytidine;
  5-chloro-2'-deoxycytidine;
  5-bromo-2'-deoxycytidine; and
  2'-deoxy-5-iodocytidine;
the corresponding $N^4$-acetyl cytidine derivatives thereof are prepared.

EXAMPLE 2

This Example illustrates methods of preparing 5'-O-methanesulfonylpurine nucleosides from the corresponding 5'-unprotected purine nucleosides. In this Example, 25 mmoles of 2',3'-O-isopropylidene-$N^6$-benzoyladenosine is dissolved in 100 ml. of pyridine and 28 mmoles of methanesulfonyl chloride are then added. The resulting reaction mixture is then maintained at 0° to 5°C for 2 hours, after which time sufficient ice is added to destroy excess methanesulfonyl chloride. The reaction mixture is then evaporated to dryness and the resulting residue dissolved in 100 ml. of chloroform. The resulting chloroform solution is washed with a saturated aqueous solution of sodium bicarbonate, then water, dried and evaporated to dryness under vacuum. This affords a crude foam of 5'-O-mesyl-2',3'-O-isopropylidene-$N^6$-benzoyladenosine which is dried under high vacuum at 20°C. The resulting dried crude foam is of sufficient purity for use in subsequent examples.

By following the same procedure as above using 9-(2,3-O-isopropylidene-β-D-ribofuranosyl)-6-methylthiopurine, 9-(2,3-O-isopropylidine-β-D-ribofuranosyl)-6-ethylthiopurine, 9-(2,-3-O-isopropylidene-β-D-ribofuranosyl)-6-mercaptopurine, 9-(2,3-O-isopropylidene-β-D-ribofuranosyl)-6-dimethylaminopurine, 2',3'-O-isopropylidene-inosine, 2',3'-O-isopropylidene-xanthosine, and the products of Example 1 as starting materials, the corresponding 5'-O-mesyl derivatives thereof are prepared.

EXAMPLE 2a

Following the procedure of Example 2 using the nucleoside derivatives prepared according to Example 1a and the following nucleoside derivatives:
  2',3'-O-isopropylideneuridine;
  2',3'-O-isopropylidene-5-fluorouridine;
  2',3'-O-isopropylidene-5-chlorouridine;
  2',3'-O-isopropylidene-5-bromouridine;
  2',3'-O-isopropylidene-5-iodouridine;
  2',3'-O-isopropylidene-5-methyl-uridine;
  2',3'-O-isopropylidene-5-trifluoromethyluridine;
  2',3'-O-isopropylidene-5-hydroxymethyluridine;
  2',3'-O-isopropylidene-5-nitrouridine;
  2',3'-O-isopropylidene-5-azauridine;
  2',3'-O-isopropylidene-6-azauridine;
  2',3'-O-isopropylidene-5-methyl-6-azauridine;
  2',3'-O-isopropylidene-2-thiouridine;
  2',3'-O-isopropylidene-4-thiouridine;
  2',3'-O-isopropylidene-2,4-dithiouridine;
  2',3'-O-isopropylidene-5-aminouridine;
  2',3'-O-isopropylidene-5-methylaminouridine;
  2',3'-O-isopropylidene-5-dimethlaminouridine;
  2'-deoxyuridine;
  2'-deoxy-5-fluorouridine;
  2'-deoxy-5-chlorouridine;
  2'-deoxy-5-bromouridine;
  2'-deoxy-5-iodouridine; and thymidine;
as starting materials, the corresponding 5'-O-mesyl derivatives thereof are prepared.

EXAMPLE 3

This Example illustrates methods of preparing 4',5'-unsaturated nucleosides. In this Example, 25 mmoles of crude 5'-O-mesyl-2',3'-O-isopropylidene-$N^6$-benzoyladenosine, prepared according to Example 2, is dissolved in 150 ml. of anhydrous tetrahydrofuran. The resulting mixture is then filtered and the resulting filtrate is recovered and cooled to 0°C and a solution of 75 mmoles of potassium t-butoxide in 75 ml. of tetrahydrofuran is slowly added to the filtrate over a period of 15 minutes. The temperature of the reaction mixture is maintained at about 0°C during this addition. The mixture is then agitated and shaken for about 25 minutes and the temperature allowed to rise to about 25°C. The resulting suspension is then poured into 400 ml. of aqueous 10% wt. sodium acetate-3% wt. acetic acid maintained at 0°C. The mixture is vigorously stirred resulting in the formation of a precipitate which is then recovered by filtration and dried. The dried precipitate is then further purified by chromatography over silica gel, affording $N^6$-benzoyl-9-(2,3-O-isopropylidene-5-deoxy-β-D-erythro-pent-4-enofuranosyl)adenine which is treated with 30 mmoles of benzoyl chloride in 250 ml. of pyridine at 20°C for 18 hours. The solvent is evaporated to dryness and the residue partitioned between chloroform and water. The chloroform extracts are dried over magnesium sulfate, filtered and evaporated to dryness. The residue is purified by chromatography over silica gel giving $N^1$, $N^6$-dibenzoyl-9-(2,3-O-isopropylidene-5-deoxy-β-D-erythro-pent-4-enofuranosyl)adenine.

By following the same procedure as above using the corresponding crude products of Example 2 and 2a as starting materials, the corresponding 5-deoxy-β-D-erythro-pent-4-enofuranosyl nucleosides and 2,5-dideoxy-β-D-glycero-pent-4-enofuranosyl nucleosides are prepared. In the case of compounds derived from nucleosides other than adenosine and substituted adenosine derivatives, the final benzoylation step can be omitted.

EXAMPLE 3a

In this Example, 3 mmoles of $N^4$-acetyl-1-(2,5-dideoxy-β-D-glycero-pent-4-enofuranosyl)cytidine are dissolved in 30 ml of pyridine containing 10 mmole of trifluoroacetic anhydride. The mixture is kept at 20°C for 18 hours, and then 10 ml. of methanol is added. After 1 hour the solvents are removed by evaporation under vacuum and the residue is partitioned between water and chloroform. The chloroform phase is dried over magnesium sulfate, filtered and evaporated to dryness under vacuum. The residue is then purified by chromatography over silica-gel-to give pure 1-(3-O-trifluoroacetyl-2,5-dideoxy-β-D-glycero-pent-4-enofuranosyl)cytosine.

By following the same procedure as above using the 2'-deoxy nucleosides of Example 3 as starting materials, the following compounds are prepared:

$N^4$-acetyl-1-(3-O-trifluoroacetyl-2,5-dideoxy-β-D-glyceropent-4-enofuranosyl)-5-fluorocytosine;

$N^4$-acetyl-1-(3-O-trifluoroocetyl-2,5-dideoxy-β-D-glyceropent-4-enofuranosyl)-5-chlorocytosine;

$N^4$-acetyl-1-(3-O-trifluoroacetyl-2,5-dideoxy-β-D-glyceropent-4-enofuranosyl)-5-bromocytosine;

$N^4$-acetyl-1-(3-O-trifluoroacetyl-2,5-dideoxy-β-D-glyceropent-4-enofuranosyl)-5-iodocytosine;

1-(3-O-trifluoroacetyl-2,5-dideoxy-β-D-glycero-pent-4-enofuranosyl)-uracil;

1-(3-O-trifluoroacetyl-2,5-dideoxy-β-D-glycero-pent-4-enofuranosyl)-5-fluorouracil;

1-(3-O-trifluoroacetyl-2,5-dideoxy-β-D-glycero-pent-4-enofuranosyl)-5-chlorouracil;

1-(3-O-trifluoroacetyl-2,5-dideoxy-β-D-glycero-pent-4-enofuranosyl)-5-iodouracil;

1-(3-O-trifluoroacetyl-2,5-dideoxy-βD-glycero-pent-4-enofuranosyl)-5-bromouracil; and 1-(3-O-trifluoroacetyl-2,5-dideoxy-β-D-glycero-pent-4-enofuranosyl)-thymine.

EXAMPLE 4

In this Example, 6 mmoles of freshly ground silver monofluoride is added to a solution containing 1 mmole of $N^1$, $N^6$-dibenzoyl-9-(2,3-O-isopropylidene-5-deoxy-β-D-erytho-pent-4-enofuranosyl)-adenine in 60 ml. of acetonitrile at 20°C. The resulting suspension is vigorously stirred and 5 mmoles of iodine is slowly added to the suspension at room temperature, over a period of one hour. The reaction mixture is maintained at room temperature for one hour and then 10 ml. of concentrated aqueous sodium chloride solution is added, resulting in the formation of a two phase system. Both phases of the reaction mixture are filtered through diatomaceous earth (Celite). The organic phase is then recovered and washed with an aqueous solution of thiosulfate, then aqueous sodium bicarbonate solution and finally water. The washed organic phase is dried over magnesium sulfate and then filtered and evaporated to dryness. The resulting residue is an epimeric mixture of $N^1,N^6$-dibenzoyl-9-(5-deoxy-4-fluoro-5-iodo-2,3-O-isopropylidene-β-D-ribofuranosyl)adenine and $N^1,N^6$-dibenzoyl-9-(5-deoxy-4-fluoro-5-iodo-2,3-O-isopropylidene-α-L-lyxofuranosyl)-adenine. The respective isomers are then resolved by preparative thin-layer chromatography on silica gel eluting with a mixture of chloroform and acetone. The respective U.V. bands corresponding to the ribo and lyxo isomers are then respectively eluted affording the respective isomers. Alternatively, the compound can be separated by chromatography on a column of silic acid. With regard to the 2'-deoxy pyrimidine nucleosides, the reaction products are treated with boiling methanol to complete the removal of the trifluoroacetyl group prior to purification. By following this modification of the above procedure using the corresponding products of Example 3a as starting materials, the following compounds are prepared:

$N^4$-acetyl-1-(2,5-dideoxy-4-fluoro-5-iodo-β-D-glyceropentofuranosyl)-cytosine;

$N^4$-acetyl-1-(2,5-dideoxy-4-fluoro-5-iodo-β-D-glyceropentofuranosyl)-5-fluorocytosine;

$N^4$-acetyl-1-(2,5-dideoxy-4-fluoro-5-iodo-β-D-glyceropentofuranosyl)-5-chlorocytosine;

$N^4$-acetyl-1-(2,5-dideoxy-4-fluoro-5-iodo-β-D-glyceropentofuranosyl)-5-bromocytosine;

$N^4$-acetyl-1-(2,5-dideoxy-4-fluoro-5-iodo-β-D-glyceropentofuranosyl)-5-iodocytosine;

1-(2,5-dideoxy-4-fluoro-5-iodo-β-D-glycero-pentofuranosyl)-uracil;

1-(2,5-dideoxy-4-fluoro-5-iodo-β-D-glycero-pentofuranosyl)-5-fluorouracil;

1-(2,5-dideoxy-4-fluoro-5-iodo-β-D-glycero-pentofuranosyl)-5-chlorouracil;

1-(2,5-dideoxy-4-fluoro-5-iodo-β-D-glycero-pentofuranosyl)-5-bromouracil;

1-(2,5-dideoxy-4-fluoro-5-iodo-β-D-glycero-pentofuranosyl)-5-iodouridine; and 1-(2,5-dideoxy-4-fluoro-5-iodo-β-D-glycero-pentofuranosyl)-thymine.

By following the same procedure as above using the corresponding products of Example 3 exclusive of those 2'-deoxy cytidine and 2'-deoxy uridine nucleoside derivatives listed in Example 3a, the following compouonds are prepared:

$N^1,N^6$-dibenzoyl-9-(5-deoxy-4-fluoro-5-iodo-2,3-O-isopropylidene-β-D-ribofuranosyl)-2-fluoroadenine;

$N^1,N^6$-dibenzoyl-9-(5-deoxy-4-fluoro-5-iodo-2,3-0-isopropylidene-β-D-ribofuranosyl)-2-chloradenine;

$N^1,N^6$-dibenzoyl-9-(5-deoxy-4-fluoro-5-iodo-2,3-O-isopropylidene-β-D-ribofuranosyl)-2-azaadenine;

9-(5-deoxy-4-fluoro-5-iodo-2,3-O-isopropylidene-β-D-ribofuranosyl)-6-mercaptopurine;

$N^1,N^6$-dibenzoyl-9-)5-deoxy-4-fluoro-5-iodo-2,3-O-isopropylidene-β-D-ribofuranosyl)-8-aza-9-deazaadenine;

$N^1,N^6$-dibenzoyl-9-(5-deoxy-4-fluoro-5-iodo-2,3-O-isopropylidene-β-D-ribofuranosyl)-7-deazaadenine;

$N^1,N^6$-dibenzoyl-9-(5-deoxy-4-fluoro-5-iodo-2,3-O-isopropylidene-β-D-ribofuranosyl)-7deaza-7-cyanoadenine;

$N^1,N^6$-dibenzoyl-9-(5-deoxy-4-fluoro-5-iodo-2,3-O-isopropylidene-β-D-ribofuranosyl)-8-azaadenine;

$N^1$-benzoyl-9-(5-deoxy-4-fluoro-5-iodo-2,3-O-isopropylidene-β-D-ribofuranosyl)-hypoxanthine;

N$^1$-benzoyl-9-(5-deoxy-4-fluoro-5-iodo-2,3,-O-isopropylidene-β-D-ribofuranosyl)-xanthine;

N$^2$-acetyl-9-(5-deoxy-4-fluoro-5-iodo-2,3-O-isopropylidene-β-D-ribofuranosyl)-guanosine;

N$^2$-acetyl-9-(5-deoxy-4-fluoro-5-iodo-2,3-O-isopropylidene-β-D-ribofuranosyl)-8-azaguanine;

N$^2$-acetyl-9-(5-deoxy-4-fluoro-5-iodo-2,3-O-isopropylidene-β-D-ribofuranosyl)-7-deazaguanine;

9-(5-deoxy-4-fluoro-5-iodo-2,3,-O-isopropylidene-β-D-ribofuranosyl)-6-methylthiopurine;

9-(5-deoxy-4-fluoro-5-iodo-2,3-O-isopropylidene-β-D-ribofuranosyl)-6-ethylthiopurine;

9-(5-deoxy-4-fluoro-5-iodo-2,3-O-isopropylidene-β-D-ribofuranosyl)-2-acetamido-6-mercaptopurine;

9-(5-deoxy-4-fluoro-5-iodo-2,3-O-isopropylidene-β-D-ribofuranosyl)-2-acetamido-6-methylthiopurine;

N-benzoyl-9-(5-deoxy-4-fluoro-5-iodo-2,3-O-isopropylidene-β-D-ribofuranosyl)-6-methylaminopurine;

9-(5-deoxy-4-fluoro-5-iodo-2,3-O-isopropylidene-β-D-ribofuranosyl)-6-dimethylaminopurine;

N-benzoyl-9-(5-deoxy-4-fluoro-5-iodo-2,3-O-isopropylidene-β-D-ribofuranosyl)-2-acetamido-6-methylaminopurine;

9-(5-deoxy-4-fluoro-5-iodo-2,3-O-isopropylidene-β-D-ribofuranosyl)-2-acetamido-6-dimethylaminopurine;

N-benzoyl-9-(5-deoxy-4-fluoro-5-iodo-2,3-O-isopropylidene β-D-ribofuranosyl)-6-(1-adamantylamino)purine;

5'-deoxy-4'-fluoro-5'-iodo-2',3'-O-isopropylidene-5-hydroxymethyluridine;

5'-deoxy-4'-fluoro-5'-iodo-2',3'-O-isopropylidene-uridine;

5'-deoxy-4'-fluoro-5'-iodo-2',3'-O-isopropylidene-5-fluorouridine;

5'-deoxy-4'-fluoro-5'-iodo-2',3'-O-isopropylidene-5-chlorouridine;

5'-deoxy-4'-fluoro-5'-iodo-2',3'-O-isopropylidene-5-bromouridine;

5'-deoxy-4'-fluoro-5'-iodo-2',3'-O-isopropylidene-5-iodouridine;

5'-deoxy-4'-fluoro-5'-iodo-2',3'-O-isopropylidene-5-methyluridine;

5'-deoxy-4'-fluoro-5'-iodo-2',3'-O-isopropylidene-5-butyluridine;

5'-deoxy-4'-fluoro-5'-iodo-2',3'-O-isopropylidene-5-trifluoromethyluridine;

5'-deoxy-4'-fluoro-5'-iodo-2',3'-O-isopropylidene-5-nitrouridine;

5'-deoxy-4'-fluoro-5'-iodo-2',3'-O-isopropylidene-5-azauridine;

5'-deoxy-4'-fluoro-5'-iodo-2',3'-O-isopropylidene-6-azauridine;

5'-deoxy-4'-fluoro-5'-iodo-2',3'-O-isopropylidene-6-aza-5-methyluridine;

5'-deoxy-4'-fluoro-5'-iodo2',3'-O-isopropylidene-6-aza-5-butyluridine;

5'-deoxy-4'-fluoro-5'-iodo-2',3'-O-isopropylidene-2-thiouridine;

5'-deoxy-4'-fluoro-5'-iodo-2',3'-O-isopropylidene-4-thiouridine;

5'-deoxy-4'-fluoro-5'-iodo-2',3'-O-isopropylidene-2-4-dithiouridine;

N$^4$-acetyl-5'-deoxy-4'-fluoro-5'-iodo-2',3'-O-isopropylidene-cytidine;

N$^4$-acetyl-5'-deoxy-4'-fluoro-5'-iodo-2',3'-O-isopropylidene-5-fluorocytidine;

N$^4$-acetyl-5'-deoxy-4'-fluoro-5'-iodo-2',3'-O-isopropylidene-5-chlorocytidine;

N$^4$-acetyl-5'-deoxy-4'-fluoro-5'-iodo-2',3'-O-isopropylidene-5-bromocytidine;

N$^4$-acetyl-5'-deoxy-4'-fluoro-5'-iodo-2',3'-O-isopropylidene-5-iodocytidine;

N$^4$-acetyl-5'-deoxy-4'-fluoro-5'-iodo-2',3'-O-isopropylidene-5-trifluoromethylcytidine;

N$^4$-acetyl-5'-deoxy-4'-fluoro-5'-iodo-2',3'-O-isopropylidene-5-ethylcytidine;

N$^4$-acetyl-5'-deoxy-4'-fluoro-5'-iodo-2',3'-O-isopropylidene-5-hydroxymethylcytidine;

N$^4$-acetyl-5'-deoxy-4'-fluoro-5'-iodo-2',3'-O-isopropylidene-5-butylcytidine;

N$^4$-acetyl-5'-deoxy-4'-fluoro-5'-iodo-2',3'-O-isopropylidene-5-nitrocytidine;

N$^4$-acetyl-5'-deoxy-4'-fluoro-5'-iodo-2',3'-O-isopropylidene-5-azacytidine;

N$^4$-acetyl-5'-deoxy-4'-fluoro-5'-iodo-2',3'-O-isopropylidene-6-azacytidine;

N$^4$-acetyl-5'-deoxy-4'-fluoro-5'-iodo 2',3'-O-isopropylidene-6-aza-5-methylcytidine;

N$^4$-acetyl-5'-deoxy-4'-fluoro-5'-iodo-2',3'-O-isopropylidene-6-aza-5-butylcytidine;

N$^4$-acetyl-5'-deoxy-4'-fluoro-5'-iodo-2',3'-O-isopropylidene-2-thiocytidine;

5'-deoxy-4'-fluoro-5'-iodo-2',3'-O-isopropylidene-5-methylaminouridine;

N$^4$-acetyl-5'-deoxy-4'-fluoro-5'-iodo-2',3'-O-isopropylidene-5-methylaminocytidine;

5'-deoxy-4'-fluoro-5'-iodo-2',3'-O-isopropylidene-5-dimethylaminourdine;

N$^4$-acetyl-5'-deoxy-4'-fluoro-5'-iodo-2',3'-O-isopropylidene-5-dimethylaminocytidine;

N$^4$-acetyl-5'-deoxy-4'-fluoro-5'-iodo-2',3'-O-isopropylidene-5-aminouridine;

N$^4$-acetyl-5'-deoxy-4'-fluoro-5'-iodo-2',3'-O-isopropylidine-5-aminocytidine;

N$^1$,N$^6$-dibenzoyl-9-(5-deoxy-4-fluoro-5-iodo-2,3-O-isopropylidene-α-L-lyxofuranosyl)-2-fluoroadenine;

N$^1$,N$^6$-dibenzoyl-9-(5-deoxy-4-fluoro-5-iodo-2,3-O-isopropylidene-α-L-lyxofuranosyl)-2-chloroadenine;

N$^1$,N$^6$-dibenzoyl-9-(5-deoxy-4-fluoro-5-iodo-2,3-O-isopropylidene-α-L-lyxofuranosyl)-2-azaadenine;

N$^1$,N$^6$-dibenzoyl-9-(5-deoxy-4-fluoro-5-iodo-2,3-O-isopropylidene-α-L-lyxofuranosyl)-adenine;

N$^1$,N$^6$-dibenzoyl-9-(5-deoxy-4-fluoro-5-iodo-2,3-O-isopropylidene-α-L-lyxofuranosyl)-8-aza-9-deazaadenine;

N$^1$,N$^6$-dibenzoyl-9-(5-deoxy-4-fluoro-5-iodo-2,3-O-isopropylidene-α-L-lyxofuranosyl)-7-deazaadenine;

N$^1$,N$^6$-dibenzoyl-9-(5-deoxy-4-fluoro-5-iodo-2,3-O-isopropylidene-α-L-lyxofuranosyl)-7-deaza-7-cyanoadenine;

N$^1$,N$^6$-dibenzoyl-9-(5-deoxy-4-fluoro-5-iodo-2,3-O-isopropylidene-α-L-lyxofuranosyl)-8-azaadenine;

N$^1$-benzoyl-9-(5-deoxy-4-fluoro-5-iodo-2,3-O-isopropylidene-α-L-lyxofuranosyl)-hypoxanthine;

N$^1$-benzoyl-9-(5-deoxy-4-fluoro-5-iodo-2,3-O-isopropylidene-α-L-lyxofuranosyl)-xanthine;

N$^2$-acetyl-9-(5-deoxy-4-fluoro-5-iodo-2,3-O-isopropylidene-α-L-lyxofuranosyl)-guanine;

N$^2$-acetyl-9-(5-deoxy-4-fluoro-5-iodo-2,3-O-isopropylidene-α-L-lyxofuranosyl)-8-azaguanine;

N$^2$-acetyl-9-(5-deoxy-4-fluoro-5-iodo-2,3-O-isopropylidene-α-L-lyxofuranosyl)-7-deazaguanine;

9-(5-deoxy-4-fluoro-5-iodo-2,3-isopropylidene-α-L-lyxofuranosyl)-6-methylthiopurine;

9-(5-deoxy-4-fluoro-5-iodo-2,3O-isopropylidene-α-L-lyxofuranosyl)-6-ethylthiopurine;

9-(5-deoxy-4-fluoro-5-iodo-2,3-O-isopropylidene-α-

L-lyxofuranosyl)-6-mercaptopurine;

9-(5-deoxy-4-fluoro-5-iodo-2,3-O-isopropylidene-α-L-lyxofuranosyl)-2-acetamido-6-mercaptopurine;

9-(5-deoxy-4-fluoro-5-iodo-2,3-O-isopropylidene-α-L-lyxofuranosyl)-2-acetamido-6-methylthiopurine;

N-benzyl-9-(5-deoxy-4-fluoro-5-iodo-2,3-O-isopropylidene-α-L-lyxofuranosyl)-6-methylaminopurine;

9-(5-deoxy-4-fluoro-5-iodo-2,3-O-isopropylidene-α-L-lyxofuranosyl)-6-dimethylaminopurine;

N-benzoyl-9-(5γdeoxy-4-fluoro-5-iodo-2,3-O-isopropylidene-α-L-lyxofuranosyl)-2-acetamido-6-methylaminopurine;

9-(5-deoxy-4-fluoro-5-iodo-2,3-O-isopropylidene-α-L-lyxofuranosyl)-2-acetamido-6-dimethylaminopurine;

N-benzoyl-9-(5-deoxy-4-fluoro-5-iodo-2,3-O-isopropylidene-α-L-lyxofuranosyl)-6-(1-adamantylamino)purine;

$N^4$-acetyl-1-(5-deoxy-4-fluoro-5-iodo-2,3-O-isopropylidene-α-L-lyxofuranosyl)-5-hydroxymethylcytosine;

$N^4$-acetyl-1-(5-deoxy-4-fluoro-5-iodo-2,3-O-isopropylidene-α-isopropylidene-α-L-lyxofuranosyl)-cytosine;

$N^4$-acetyl-1-(5-deoxy-4-fluoro-5-iodo-2,3-O-isopropylidene-α-L-lyxofuranosyl)-5-flurocytosine;

$N^4$-acetyl-1-(5-iodo-2,3-O-isopropylidene-α-L-lyxofuranosyl)-5-chlorocytosine;

$N^4$-acetyl-1-(5-deoxy-4-fluoro-5-iodo-2,3-O-isopropylidene-α-L-lyxofuranosyl)-5-bromocytosine;

$N^4$-acetyl-1-(5-deoxy-4-fluoro-5-iodo-2,3-O-isopropylidene-α-L-lyxofuranosyl)-5-iodocytosine;

$N^4$-acetyl-1-(5-deoxy-4-fluoro-5-iodo-2,3-O-isopropylidene-α-L-lyxofuranosyl)-5-methylcytosine;

$N^4$-acetyl-1-(5-deoxy-4-fluoro-5-iodo-2,3-O-isopropylidene-αL-lyxofuranosyl)-5-butylcytosine;

$N^4$-acetyl-1-(5-deoxy-4-fluoro-5-iodo-2,3-O-isopropylidene-α-L-lyxofuranosyl)-5-trifluoromethylcytosine;

$N^4$-acetyl-1-(5-deoxy-4-fluoro-5-iodo-2,3-O-isopropylidene-α-L-lyxofuranosyl)-5-nitrocytosine;

$N^4$-acetyl-1-(5-deoxy-4-fluoro-5-iodo-2,3-O-isopropylidene-α-L-lyxofuranosyl)-5-azacytosine;

$N^4$-acetyl-1-(5-deoxy-4-fluoro-5-iodo-2,3-O-isopropylidene-α-L-lyxofuranosyl)-6-azacytosine;

$N^4$-acetyl-1-(5-deoxy-4-fluoro-5-iodo-2,3-O-isopropylidene-α-L-lyxofuranosyl)-6-aza-5-methylcytosine;

$N^4$-acetyl-1-(5-deoxy-4-fluoro-5-iodo-2,3-O-isopropylidene-α-L-lyxofuranosyl)-6-aza-5-butylcytosine;

$N^4$-acetyl-1-(5-deoxy-4-fluoro-5-iodo-2,3-O-isopropylidene-α-L-lyxofuranosyl)-2-thiocytosine;

$N^4$-acetyl-1-(5-deoxy-4-fluoro-5-iodo-2,3-O-isopropylidene-α-L-lyxofuranosyl)-5-aminocytosine;

$N^4$-acetyl-1-(5-deoxy-4-fluoro-5-iodo-2,3-O-isopropylidene-α-L-lyxofuranosyl)-5-methylaminocytosine;

$N^4$-acetyl-1-(5-deoxy-4-fluoro-5-iodo-2,3-O-isopropylidene-α-L-lyxofuranosyl)-5-dimethylaminocytosine;

1-(5-deoxy-4-fluoro-5-iodo-2,3-O-isopropylidene-α-L-lyxofuranosyl)-uracil;

1-(5-deoxy-4-fluoro-5-iodo-2,3-O-isopropylidene-α-L-lyxofuranosyl)-5-fluorouracil;

1-(5-deoxy-4-fluoro-5-iodo-2,3-O-isopropylidene-α-L-lyxofuranosyl)-5-chlorouracil;

1-(5-deoxy-4-fluoro-5-iodo-2,3-O-isopropylidene-α-L-lyxofuranosyl)-5-bromouracil;

1-(5-deoxy-4-fluoro-5-iodo-2,3-O-isopropylidene-α-L-lyxofuranosyl)-5-iodouracil;

1-(5-deoxy-4-fluoro-5-iodo-2,3-O-isopropylidene-α-L-lyxofuranosyl)-5-methyluracil;

1-(5-deoxy-4-fluoro-5-iodo-2,3-O-isopropylidene-α-L-lyxofuranosyl)-5-trifluoromethyluracil;

1-(5-deoxy-4-fluoro-5-iodo-2,3-O-isopropylidene-α-L-lyxofuranosyl)-5-hydroxymethyluracil;

1-(5-deoxy-4-fluoro-5-iodo-2,3-O-isopropylidene-α-L-lyxofuranosyl)-5-nitrouracil;

1-(5-deoxy-4-fluoro-5-iodo-2,3-O-isopropylidene-α-L-lyxofuranosyl)-5-azauracil;

1-(5-deoxy-4-fluoro-5-iodo-2,3-O-isopropylidene-α-L-lyxofuranosyl)-6-azauracil;

1-(5-deoxy-4-fluoro-5-iodo-2,3-O-isopropylidene-αα-L-lyxofuranosyl)-5-methyl-6-azauracil;

1-(5-deoxy-4-fluoro-5-iodo-2,3-O-isopropylidene-α-L-lyxofuranosyl)-2-thiouracil;

1-(5-deoxy-4-fluoro-5-iodo-2,3-O-isopropylidene-α-L-lyxofuranosyl)-4-thiouracil;

1-(5-deoxy-4-fluoro-5-iodo-2,3-O-isopropylidene-α-L-lyxofuranosyl)-2,4-dithiouracil;

1-(5-deoxy-4-fluoro-5-iodo-2,3-O-isopropylidene-α-L-lyxofuranosyl)-5-aminouracil;

1-(5-deoxy-4-fluoro-5-iodo-2,3-O-isopropylidene-α-L-lyxofuranosyl)-5-methylaminouracil; and 1-(5-deoxy-4-fluoro-5-iodo-2,3-O-isopropylidene-α-L-lyxofuranosyl)-5-dimethylaminouracil.

EXAMPLE 5

This Example illustrates methods of preparing 5'-deoxy-4'-fluoro nucleosides of this invention. In this Example, 1 mmole of $N^1,N^6$-dibenzoyl-5'-deoxy-4'-fluoro-5'-iodo-2',3'-O-isopropylidene-adenosine, prepared according to Example 4, is dissolved in 50 ml. of ethyl acetate containing 100 mg. of 5% palladium impregnated barium sulfate catalyst in suspension. The suspension is vigorously stirred and maintained under one atmosphere of hydrogen pressure for 24 hours at 20°C. The catalyst is then removed by filtration and the ethyl acetate solvent is evaporated. The residue is then dissolved in 10 ml. of 80% aqueous formic acid and allowed to stand for 24 hours at 20°C in order to hydrolyze the isopropylidene group and then evaporated to dryness. The benzoyl, acetyl or trifluoroacetyl protecting groups of the nucleoside are then removed by dissolving the resulting residue in a 1:1 (by vol.) mixture of methanol and concentrated ammonium hydroxide and allowing the resulting solution to stand for 24 hours at 20°C. This reaction mixture is then in turn evaporated to dryness and the resulting residue further purified by preparative thin-layer chromatography on silicic acid yielding 5'-deoxy-4'-fluoroadenosine.

Similarly, by following the same procedure as above using the 4'-fluoronucleoside products of Example 4 wherein the base moiety is $B^2$ ($B^5$ for 2'-deoxy-4'-fluoronucleosides) as starting materials, but omitting the formic acid treatment when the starting material has no isopropylidene protecting group, the following compounds are prepared:

9-(5-deoxy-4-fluoro-α-L-lyxofuranosyl)-2-amino-6-dimethylaminopurine;

9-(5-deoxy-4-fluoro-α-L-lyxofuranosyl)-6-(1-adamantyl-amino)purine;

9-(5-deoxy-4-fluoro-β-D-ribofuanosyl)-2-fluoroadenine;

9-(5-deoxy-4-fluoro-β-D-ribofuranosyl)-2-chloroadenine;

9-(5-deoxy-4-fluoro-β-D-ribofuranosyl)-2-azaadenine;

9-(5-deoxy-4-fluoro-α-L-lyxofuranosyl)-6-dimethylaminopurine;

9-(5-deoxy-4-fluoro-β-D-ribofuranosyl)-8-aza-9-deazaadenine;
9-(5-deoxy-4-fluoro-β-D-ribofuranosyl)-7-deazaadenine;
9-(5-deoxy-4-fluoro-β-D-ribofuranosyl)-7-deaza-7-cyanoadenine;
9-(5-deoxy-4-fluoro-β-D-ribofuranosyl)-8-azaadenine;
9-(5-deoxy-4-fluoro-β-D-ribofuranosyl)-hypoxanthine;
9-(5-deoxy-4-fluoro-β-D-ribofuranosyl)-xanthine;
9-(5-deoxy-4-fluoro-β-D-ribofuranosyl)-guanine;
9-(5-deoxy-4-fluoro-β-D-ribofuranosyl)-8-azaguanine;
9-(5-deoxy-4-fluoro-β-D-ribofuranosyl)-7-deazaguanine;
9-(5-deoxy-4-fluoro-β-D-ribofuranosyl)-6-methylaminopurine;
9-(5-deoxy-4-fluoro-β-D-ribofuranosyl)-6-dimethylaminopurine;
9-(5-deoxy-4-fluoro-β-D-ribofuranosyl)-2-amino-6-methylaminopurine;
9-(5-deoxy-4-fluoro-β-D-ribofuranosyl)-2-amino-6-dimethylaminopurine;
9-(5-deoxy-4-fluoro-α-L-lyxofuranosyl)-8-aza-9-deaza-adenine;
9-(5-deoxy-4-fluoro-β-D-ribofuranosyl)-6-(1-adamantylamino)purine;
9-(5-deoxy-4-fluoro-α-L-lyxofuranosyl)-adenine;
9-(5-deoxy-4-fluoro-α-L-lyxofuranosyl)-2-fluoroadenine;
9-(5-deoxy-4-fluoro-α-L-lyxofuranosyl)-2-chloroadenine;
9-(5-deoxy-4-fluoro-α-L-lyxofuranosyl)-2-azaadenine;
9-(5-deoxy-4-fluoro-α-L-lyxofuranosyl)-6-methylaminopurine;
9-(5-deoxy-4-fluoro-α-L-lyxofuranosyl)-2-amino-6-methylaminopurine;
9-(5-deoxy-4-fluoro-α-L-lyxofuranosyl)-7-deazaadenine;
9-(5-deoxy-4-fluoro-α-L-lyxofuranosyl)-7-deaza-7-cyanoadenine;
9-(5-deoxy-4-fluoro-α-L-lyxofuranosyl)-8-azaadenine;
9-(5-deoxy-4-fluoro-α-L-lyxofuranosyl)-hypoxanthine;
9-(5-deoxy-4-fluoro-α-L-lyxofuranosyl)-xanthine;
9-(5-deoxy-4-fluoro-5-iodo-α-L-lyxofuranosyl)-guanine;
9-(5-deoxy-4-fluoro-α-L-lyxofuranosyl)-8-azaguanine; and
9-(5-deoxy-4-fluoro-α-L-lyxofuranosyl)-7-deazaguanine.

Similarly, by following the same procedure as above but conducting the reduction in the presence of a slight molar excess of triethylamine in order to suppress reduction of the cytosine ring, the following compounds are prepared:
5'-deoxy-4'-fluoro-cytidine;
5'-deoxy-4'-fluoro-5-fluorocytidine;
5'-deoxy-4'-fluoro-5-chlorocytidine;
5'-deoxy-4'-fluoro-5-trifluoromethylcytidine;
5'-deoxy-4'-fluoro-5-ethylcytidine;
5'-deoxy-4'-fluoro-5-hydroxymethylcytidine;
5'-deoxy-4'-fluoro-5-butylcytidine;
5'-deoxy-4'-fluoro-5-azacytidine;
5'-deoxy-4'-fluoro-6-azacytidine;
5'-deoxy-4'-fluoro-6-aza-5-methylcytidine;
5'-deoxy-4'-fluoro-5-methylaminouridine;
5'-deoxy-4'-fluoro-5-methylaminocytidine;
5'-deoxy-4'-fluoro-5-dimethylaminouridine;
5'-deoxy-4'-fluoro-5-dimethylaminocytidine;
2',5'-dideoxy-4'-fluoro-cytidine;
2',5'-dideoxy-4'-fluoro-5-fluorocytidine; and
2',5'-dideoxy-4'-fluoro-5-chlorocytidine.

Similarly, by following the same procedure as above but omitting the treatment with methanol and concentrated ammonium hydroxide for uracil nucleosides of Example 4 which are used as starting materials, the following compounds are prepared:
5'-deoxy-4'-fluorouridine;
5'-deoxy-4'-fluoro-5-fluorouridine;
5'-deoxy-4'-fluoro-5-chlorouridine;
5'-deoxy-4'-fluoro-5-methyluridine;
5'-deoxy-4'-fluoro-5-isopropyluridine;
5'-deoxy-4'-fluoro-5-butyluridine;
5'-deoxy-4'-fluoro-5-trifluoromethyluridine;
5'-deoxy-4'-fluoro-5-azauridine;
5'-deoxy-4'-fluoro-6-azauridine;
5'-deoxy-4'-fluoro-6-aza-5-methyluridine;
2',5'-dideoxy-4'-fluorouridine;
2',5'-dideoxy-4'-fluoro-5-fluorouridine;
2',5'-dideoxy-4'-fluoro-5-chlorouridine; and
2',5'-dideoxy-4'-fluoro-thymidine.

EXAMPLE 6

This Example illustrates methods of preparing the 5'-azido-4'-fluoro-nucleosides of this invention. In this Example, 1 mmole of $N^1$, $N^6$-dibenzoyl-9-(5-deoxy-4-fluoro-5-iodo-2,3-O-isopropylidene-β-D-ribofuranosyl)-adenine is dissolved in 10 ml. of dimethylformamide containing 4 mmoles of lithium azide, at 100°C. The reaction mixture is maintained at 100°C for 20 hours and then the dimethylformamide solvent is removed by vacuum evaporation. The resulting residue is partitioned between chloroform and water and the resulting organic phase is separated and dried over magnesium sulfate, then filtered and evaporated to dryness. The benzoyl, acetyl or trifluoroacetyl protecting groups are removed from the base moiety by dissolving the residue in 10 ml. of a 1:1 (by vol.) mixture of methanol and ammonium hydroxide. The mixture is allowed to stand for 18 hours at 20°C and is then evaporated to dryness. The resulting residue purified by chromatography over silica gel yields pure 5'-azido-5'-deoxy-4'-fluoro-2',3'-O-isopropylideneadenosine.

Similarly, by following the same procedure as above using the 4'-fluoro-5'-iodo nucleoside products of Example 4 as starting materials, the corresponding 5'-azido-5'-deoxy-4'-fluoro-2',3'-O-isopropylidene nucleoside derivatives or the corresponding 5'-azido 2',5'-dideoxy-4'-fluoro nucleoside derivatives are prepared.

EXAMPLE 6a

This Example illustrates methods of preparing the 5'-azido-4'-fluoro-nucleosides of this invention. In this Example, 1 mmole of 5'-azido-5'-deoxy-4'-fluoro-2',3'-O-isopropylidene adenosine of Example 6 is treated with 10 ml. of 90% trifluoroacetic acid at 20°C for 30 minutes. The reaction mixture is evaporated to dryness and made slightly alkaline (pH 8–9) with ammonium hydroxide. The reaction mixture is evaporated to dryness and the residue is purified by chromatography over silica gel yielding pure 5'-azido-5'-deoxy-4'-fluoroadenosine.

Similarly, by following the same procedure as above using the 4'-fluoro-5'-iodo nucleoside products of Example 4 as starting materials but omitting the trifluoroacetic acid treatment when the starting material has no isopropylidene protecting group, the following compounds are prepared:

9-(5-azido-5-deoxy-4-fluoro-α-L-lyxofuranosyl)-adenine;
9-(5-azido-5-deoxy-4-fluoro-β-D-ribofuranosyl)-2-fluoroadenine;
9-(5-azido-5-deoxy-4-fluoro-β-D-ribofuranosyl)-2-chloroadenine;
9-(5-azido-5-deoxy-4-fluoro-β-D-ribofuranosyl)-2-azaadenine;
9-(5-azido-5-deoxy-4-fluoro-β-D-ribofuranosyl)-2-amino-6-mercaptopurine;
9-(5-azido-5-deoxy-4-fluoro-β-D-ribofuranosyl)-8-aza-9-deazaadenine;
9-(5-azido-5-deoxy-4-fluoro-β-D-ribofuranosyl)-7-deazaadenine;
9-(5-azido-5-deoxy-4-fluoro-β-D-ribofuranosyl)-7-deaza-7-cyanoadenine;
9-(5-azido-5-deoxy-4-fluoro-β-D-ribofuranosyl)-8-azaadenine;
9-(5-azido-5-deoxy-4-fluoro-β-D-ribofuranosyl)-hypoxanthine;
9-(5-azido-5-deoxy-4-fluoro-β-D-ribofuranosyl)-6-mercaptopurine;
9-(5-azido-5-deoxy-4-fluoro-β-D-ribofuranosyl)-6-methylthiopurine;
9-(5-azido-5-deoxy-4-fluoro-β-D-ribofuranosyl)-xanthine;
9-(5-azido-5-deoxy-4-fluoro-β-D-ribofuranosyl)-guanosine;
9-(5-azido-5-deoxy-4-fluoro-β-D-ribofuranosyl)-2-amino-6-methylthiopurine;
9-(5-azido-5-deoxy-4-fluoro-β-D-ribofuranosyl)-8-azaguanine;
9-(5-azido-5-deoxy-4-fluoro-β-D-ribofuranosyl)-7-deazaguanine;
9-(5-azido-5-deoxy-4-fluoro-β-D-ribofuranosyl)-6-methylaminopurine;
9-(5-azido-5-deoxy-4-fluoro-β-D-ribofuranosyl)-6-dimethylaminopurine;
9-(5-azido-5-deoxy-4-fluoro-β-D-ribofuranosyl)-2-amino-6-methylaminopurine;
9-(5-azido-5-deoxy-4-fluoro-β-D-ribofuranosyl)-2-amino-6-dimethylaminopurine;
9-(5-azido-5-deoxy-4-fluoro-β-D-ribofuranosyl)-6-(1-adamantylamino)purine;
9-(5-azido-5-deoxy-4-fluoro-α-L-lyxofuranosyl)-8-aza-9-deazaadenine;
9-(5-azido-5-deoxy-4-fluoro-α-L-lyxofuranosyl)-2-fluoroadenine;
9-(5-azido-5-deoxy-4-fluoro-α-L-lyxofuranosyl)-2-chloroadenine;
9-(5-azido-5-deoxy-4-fluoro-α-L-lyxofuranosyl)-2-azaadenine;
9-(5-azido-5-deoxy-4-fluoro-α-L-lyxofuranosyl)-7-deazaadenine;
9-(5-azido-5-deoxy-4-fluoro-α-L-lyxofuranosyl)-7-deaza-7-cyanoadenine;
9-(5-azido-5-deoxy-4-fluoro-α-L-lyxofuranosyl)-8-azaadenine;
9-(5-azido-5-deoxy-4-fluoro-α-L-lyxofuranosyl)-hypoxanthine;
9-(5-azido-5-deoxy-4-fluoro-α-L-lyxofuranosyl)-6-mercaptopurine;
9-(5-azido-5-deoxy-4-fluoro-α-L-lyxofuranosyl)-6-methylthiopurine;
9-(5-azido-5-deoxy-4-fluoro-α-L-lyxofuranosyl)-xanthine;
9-(5-azido-5-deoxy-4-fluoro-α-L-lyxofuranosyl)-guanine;
9-(5-azido-5-deoxy-4-fluoro-α-L-lyxofuranosyl)-2-amino-6-mercaptopurine;
9-(5-azido-5-deoxy-4-fluoro-α-L-lyxofuranosyl)-2-amino-6-methylthiopurine;
9-(5-azido-5-deoxy-4-fluoro-α-L-lyxofuranosyl)-8-azaguanine;
9-(5-azido-5-deoxy-4-fluoro-α-L-lyxofuranosyl)-7-deazaguanine;
9-(5-azido-5-deoxy-4-fluoro-α-L-lyxofuranosyl)-6-methylaminopurine;
9-(5-azido-5-deoxy-4-fluoro-α-L-lyxofuranosyl)-6-dimethylaminopurine;
9-(5-azido-5-deoxy-4-fluoro-α-L-lyxofuranosyl)-2-amino-6-methylaminopurine;
9-(5-azido-5-deoxy-4-fluoro-α-L-lyxofuranosyl)-2-amino-6-dimethylaminopurine;
9-(5-azido-5-deoxy-4-fluoro-α-L-lyxofuranosyl)-6-(1-adamantylamino)purine.

5'-azido-5'-deoxy-4'-fluorouridine;
5'-azido-5'-deoxy-4'-fluoro-5-fluorouridine;
5'-azido-5'-deoxy-4'-fluoro-5-chlorouridine;
5'-azido-5'-deoxy-4'-fluoro-5-bromouridine;
5'-azido-5'-deoxy-4'-fluoro-5-iodouridine;
5'-azido-5'-deoxy-4'-fluoro-5-methyluridine;
5'-azido-5'-deoxy-4'-fluoro-5-hydroxymethyluridine;
5'-azido-5'-deoxy-4'-fluoro-5-butyluridine;
5'-azido-5'-deoxy-4'-fluoro-5-trifluoromethyluridine;
5'-azido-5'-deoxy-4'-fluoro-5-nitrouridine;
5'-azido-5'-deoxy-4'-fluoro-5-azauridine;
5'-azido-5'-deoxy-4'-fluoro-6-azauridine;
5'-azido-5'-deoxy-4'-fluoro-6-aza-5-methyluridine;
5'-azido-5'-deoxy-4'-fluoro-2-thiouridine;
5'-azido-5'-deoxy-4'-fluoro-4-thiouridine;
5'-azido-5'-deoxy-4'-fluoro-2,4-dithiouridine;
5'-azido-5'-deoxy-4'-fluorocytidine;
5'-azido-5'-deoxy-4'-fluoro-5-fluorocytidine;
5'-azido-5'-deoxy-4'-fluoro-5-chlorocytidine;
5'-azido-5'-deoxy-4'-fluoro-5-bromocytidine;
5'-azido-5'-deoxy-4'-fluoro-5'-iodocytidine;
5'-azido-5'-deoxy-4'-fluoro-6-trifluoromethylcytidine;
5'-azido-5'-deoxy-4'-fluoro-5-ethylcytidine;
5'-azido-5'-deoxy-4'-fluoro-5-hydroxymethyluridine;
5'-azido-5'-deoxy-4'-fluoro-5-butylcytidine;
5'-azido-5'-deoxy-4'-fluoro-5-nitrocytidine;
5'-azido-5'-deoxy-4'-fluoro-5-azacytidine;
5'-azido-5'-deoxy-4'-fluoro-6-azacytidine;
5'-azido-5'-deoxy-4'-fluoro-6-aza-5-methylcytidine;
5'-azido-5'-deoxy-4'-fluoro-2-thiocytidine;
5'-azido-5'-deoxy-4'-fluoro-5-methylaminouridine;
5'-azido-5'-deoxy-4'-fluoro-5-methylaminocytidine;
5'-azido-5'-deoxy-4'-fluoro-5-aminouridine;
5'-azido-5'-deoxy-4'-fluoro-5-aminocytidine;
5'-azido-5'-deoxy-4'-fluoro-5-dimethylaminouridine;
5'-azido-5'-deoxy-4'-fluoro-5'dimethylaminocytidine;

Similarly, by following the same procedure as above, using the 1-(5-deoxy-4-fluoro-5-iodo-α-L-lyxofuranosyl)pyrimidine nucleosides of Example 4 as starting materials, the corresponding 5'-azido derivatives thereof as prepared.

Similarly, by following the same procedure as above, using the 2',5'-dideoxy-4'-fluoro-5'-iodo-pyrimidine nucleosides of Example 4 as starting materials the following 5'-azido derivative thereof are prepared:

5'-azido-2',5'-dideoxy-4'-fluorocytidine;
5'-azido-2',5'-dideoxy-4'-fluoro-5-fluorocytidine;
5'-azido-2',5'-dideoxy-4'-fluoro-5-chlorocytidine;
5'-azido-2',5'-dideoxy-4'-fluoro-5-bromocytidine;
5'-azido-2',5'-dideoxy-4'-fluoro-5-iodocytidine;
5'-azido-2',5'-dideoxy-4'-fluorouridine;
5'-azido-2',5'-dideoxy-4'-fluoro-5-fluorouridine;
5'-azido-2',5'-dideoxy-4'-fluoro-5-chlorouridine;
5'-azido-2',5'-dideoxy-4'-fluoro-5-bromouridine;
5'-azido-2',5'-dideoxy-4'-fluoro-5-iodouridine; and
5'-azido-2',5'-dideoxy-4'-fluoro-thymidine.

EXAMPLE 7

This Example illustrates methods of preparing the 5'-amino-5'-deoxy-4'-fluoro nucleosides of this invention. In this Example, 1 mmole of 5'-azido-5'-deoxy-4'-fluoro-adenosine, prepared according to Example 6a, is dissolved in 50 ml. of methanol containing 100 mg. of 5% palladium impregnated barium sulfate catalyst. The reaction mixture is stirred vigorously, at 20°C, and maintained under one atmosphere of hydrogen pressure for 12 hours. The solvent is then evaporated and the resulting residue purified by chromatography to afford 5'-amino-5'-deoxy-4'-fluoro-adenosine.

Similarly, by following the same procedure using the corresponding 5'-azido-5'-deoxy-4'-fluoro-nucleoside products of Example 6a wherein the base moiety is $B^2$ ($B^5$ in the case of 2'-deoxy-4'-fluoro nucleosides) as starting materials, the following compounds are respectively prepared:

9-(5-amino-5-deoxy-4-fluoro-β-D-ribofuranosyl)-2-fluoroadenine;
9-(5-amino-5-deoxy-4-fluoro-β-D-ribofuranosyl)-2-chloroadenine;
9-(5-amino-5-deoxy-4-fluoro-β-D-ribofuranosyl)-2-azaadenine;
9-(5-amino-5-deoxy-4-fluoro-β-D-ribofuranosyl)-7-deaza-7-cyanoadenine;
9-(5-amino-5-deoxy-4-fluoro-β-D-ribofuranosyl)-8-aza-9-deazaadenine;
9-(5-amino-5-deoxy-4-fluoro-β-D-ribofuranosyl)-7-deazaadenine; 9-(5-amino-5-deoxy-4-fluoro-β-D-ribofuranosyl)-8-azaadenine;
9-(5-amino-5-deoxy-4-fluoro-β-D-ribofuranosyl)-hypoxanthine;
9-(5-amino-5-deoxy-4-fluoro-β-D-ribofuranosyl)-xanthine;
9-(5-amino-5-deoxy-4-fluoro-β-D-ribofuranosyl)-guanine;
9-(5-amino-5-deoxy-4-fluoro-β-D-ribofuranosyl)-8-azaguanine;
9-(5-amino-5-deoxy-4-fluoro-β-D-ribofuranosyl)-7-deazaguanine;
9-(5-amino-5-deoxy-4-fluoro-β-D-ribofuranosyl)-6-methylaminopurine;
9-(5-amino-5-deoxy-4-fluoro-β-D-ribofuranosyl)-6-dimethylaminopurine;
9-(5-amino-5-deoxy-4-fluoro-β-D-ribofuranosyl)-2-amino-6-methylaminopurine;
9-(5-amino-5-deoxy-4-fluoro-β-D-ribofuranosyl)-2-amino-6-dimethylaminopurine;
9-(5-amino-5-deoxy-4-fluoro-β-D-ribofuranosyl)-6-(1-adamantylamino)-purine;
9-(5-amino-5-deoxy-4-fluoro-α-L-lyxofuranosyl)-2-azaadenine;
9-(5-amino-5-deoxy-4-fluoro-α-L-lyxofuranosyl)-adenine;
9-(5-amino-5-deoxy-4-fluoro-α-L-lyxofuranosyl)-2-fluoroadenine;
9-(5-amino-5-deoxy-4-fluoro-α-L-lyxofuranosyl)-2-chloroadenine;
9-(5-amino-5-deoxy-4-fluoro-α-L-lyxofuranosyl)-6-(1-adamantylamino)-purine;
9-(5-amino-5-deoxy-4-fluoro-α-L-lyxofuranosyl)-2-amino-6-dimethylaminopurine;
9-(5-amino-5-deoxy-4-fluoro-α-L-lyxofuranosyl)-8-aza-9-deazaadenine;
9-(5-amino-5-deoxy-4-fluoro-α-L-lyxofuranosyl)-7-deazaadenine;
9-(5-amino-5-deoxy-4-fluoro-α-L-lyxofuranosyl)-7-deaza-7-cyanoadenine;
9-(5-amino-5-deoxy-4-fluoro-α-L-lyxofuranosyl)-8-azaadenine;
9-(5-amino-5-deoxy-4-fluoro-α-L-lyxofuranosyl)-hypoxanthine;
9-(5-amino-5-deoxy-4-fluoro-α-L-lyxofuranosyl)-xanthine;
9-(5-amino-5-deoxy-4-fluoro-α-L-lyxofuranosyl)-guanine;
9-(5-amino-5-deoxy-4-fluoro-α-L-lyxofuranosyl)-8-azaguanine;
9-(5-amino-5-deoxy-4-fluoro-α-L-lyxofuranosyl)-7-deazaguanine;
9-(5-amino-5-deoxy-4-fluoro-α-L-lyxofuranosyl)-6-methylaminopurine;
9-(5-amino-5-deoxy-4-fluoro-α-L-lyxofuranosyl)-6-dimethylaminopurine;
9-(5-amino-5-deoxy-4-fluoro-α-L-lyxofuranosyl)-2-amino-6-methylaminopurine;
5'-amino-5'-deoxy-4'-fluoro-5-azauridine;
5'-amino-5'-deoxy-4'-fluoro-6-azauridine;
5'-amino-5'-deoxy-4'-fluorouridine;
5'-amino-5'-deoxy-4'-fluoro-5-isopropyluridine;
5'-amino-5'-deoxy-4'-fluoro-5-butyluridine;
5'-amino-5'-deoxy-4'-fluoro-5-trifluoromethyluridine;
5'-amino-5'-deoxy-4'-fluoro-5-aminouridine;
5'-amino-5'-deoxy-4'-fluoro-5-fluorouridine;
5'-amino-5'-deoxy-4'-fluoro-5-chlorouridine;
5'-amino-5'-deoxy-4'-fluoro-5-methyluridine;
5'-amino-5'-deoxy-4'-fluoro-6-aza-5-methyluridine;
5'-amino-5'-deoxy-4'-fluorocytidine;
5'-amino-5'-deoxy-4'-fluoro-5-fluorocytidine;
5'-amino-5'-deoxy-4'-fluoro-5-chlorocytidine;
5'-amino-5'-deoxy-4'-fluoro-6-trifluoromethylcytidine;
5'-amino-5'-deoxy-4'-fluoro-5-ethylcytidine;
5'-amino-5'-deoxy-4'-fluoro-5-hydroxymethylcytidine;
5'-amino-5'-deoxy-4'-fluoro-5-butylcytidine;
5'-amino-5'-deoxy-4'-fluoro-5azacytidine;
5'-amino-5'-deoxy-4'-fluoro-6-azacytidine;
5'-amino-5'-deoxy-4'-fluoro-6-aza-5-methylcytidine;
5'-amino-5'-deoxy-4'-fluoro-5-methylaminouridine;
5'-amino-5'-deoxy-4'-fluoro-5-methylaminocytidine;
5'-amino-5'-deoxy-4'-fluoro-5-dimethylaminouridine;
5'-amino-5'-deoxy-4'-fluoro-5-dimethylaminocytidine; and
5'-amino-5'-deoxy-4'-fluoro-5-aminocytidine.

Similarly, by following the same procedure as above, using the 1-(5-azido-5-deoxy-4-fluoro-α-L-lyxofuranosyl)pyrimidine nucleosides of Example 6a as starting materials, the corresponding 5'-amino derivatives thereof are prepared.

Similarly, by following the same procedure as above, using the 5'-azido-2',5'-dideoxy-4'-fluoro-pyrimidine nucleosides of Example 6a as starting materials, the following 5'-amino derivatives thereof are prepared:

5'-amino-2',5'-dideoxy-4'-fluorocytidine;
5'-amino-2',5'-dideoxy-4'-fluoro-5-fluorocytidine;
5'-amino-2',5'-dideoxy-4'-fluoro-5-chlorocytidine;
5'-amino-2',5'-dideoxy-4'-fluorouridine;
5'-amino-2',5'-dideoxy-4'-fluoro-5-fluorouridine;
5'-amino-2',5'-dideoxy-4'-fluoro-5-chlorouridine; and
5'-amino-2',5'-dideoxy-4'-fluoro-thymidine.

EXAMPLE 8

This Example illustrates methods of preparing the 4'-fluoro nucleosides of this invention from the corresponding 5'-azido-5'-deoxy-4'-fluoronucleosides. In this Example, 1 mmole of 5'-azido-5'-deoxy-4'-fluoro-2',3'-O-isopropylideneadenosine, prepared according to Example 6, is dissolved in 5 ml. of dioxane, then diluted with 300 ml. of benzene at 20°C. The solution is then irradiated in a pyrex apparatus with a high pressure ultraviolet source. The progress of the reaction is periodically monitored by thin-layer chromatography and irradiation is discontinued when the starting material has disappeared. The dioxane and benzene solvents are then removed by evaporation and the resulting residue dissolved in 10 ml. of dioxane. Two ml. of one Normal aqueous hydrochloric acid is then added and the resulting mixture heated for 30 seconds at 100°C. The mixture is then cooled to 20°C and neutralized by the addition of solid sodium bicarbonate. Five mmoles of sodium borohydride are then added and the reaction mixture stirred for 15 minutes at 20°C. Excess sodium borohydride is destroyed by the addition of glacial acetic acid and the solution is then again neutralized to a pH of 7 by the addition of solid sodium bicarbonate. The reaction mixture is then evaporated to dryness and the resulting residue is extracted with hot ethanol. The resulting extracts are then combined, filtered, and evaporated to dryness affording a residue which is further purified by preparative thin-layer chromatography over silica gel, using chloroform-methanol (9:1) yielding pure 4'-fluoro-2',3'-O-isopropylideneadenosine that can be crystallized from ethanol.

Similarly, by following the same procedure as above except that, in certain instances, the iradiation is conducted in methanol due to the low solubility of the starting materials in benzene, and using the corresponding 5'-azido-5'-deoxy-4'-fluoro-2',3'-O-isopropylidene purine nucleosides of Example 6 as starting materials, the following compounds are prepared:

9-(4-fluoro-2,3-O-isopropylidene-β-D-ribofuranosyl)-2-fluoroadenine;
9-(4-fluoro-2,3-O-isopropylidene-β-D-ribofuranosyl)-2-chloroadenine;
9-(4-fluoro-2,3-O-isopropylidene-β-D-ribofuranosyl)-2-azaadenine;
9-(4-fluoro-2,3-O-isopropylidene-β-D-ribofuranosyl)-8-aza-9-deazaadenine;
9-(4-fluoro-2,3-O-isopropylidene-β-D-ribofuranosyl)-7-deazaadenine;
9-(4-fluoro-2,3-O-isopropylidene-β-D-ribofuranosyl)-7-deaza-7-cyanoadenine;
9-(4-fluoro-2,3-O-isopropylidene-β-D-ribofuranosyl)-8-azaadenine;
9-(4-fluoro-2,3-O-isopropylidene-β-D-ribofuranosyl)-hypoxanthine;
9-(4-fluoro-2,3-O-isopropylidene-β-D-ribofuranosyl)-xanthine;
9-(4-fluoro-2,3-O-isopropylidene-β-D-ribofuranosyl)-guanine;
9-(4-fluoro-2,3-O-isopropylidene-β-D-ribofuranosyl)-8-azaguanine;
9-(4-fluoro-2,3-O-isopropylidene-β-D-ribofuranosyl)-7-deazaguanine;
9-(4-fluoro-2,3-O-isopropylidene-β-D-ribofuranosyl)-6-methylaminopurine;
9-(4-fluoro-2,3-O-isopropylidene-β-D-ribofuranosyl)-6-dimethylaminopurine;
9-(4-fluoro-2,3-O-isopropylidene-β-D-ribofuranosyl)-2-amino-6-dimethylaminopurine;
9-(4-fluoro-2,3-O-isopropylidene-β-D-ribofuranosyl)-2-amino-6-methylaminopurine;
9-(4-fluoro-2,3-O-isopropylidene-β-D-ribofuranosyl)-6-(1-adamantylamino)-purine;
9-(4-fluoro-2,3-O-isopropylidene-α-L-lyxofuranosyl)-7-deaza-7-cyanoadenine;
9-(4-fluoro-2,3-O-isopropylidene-α-L-lyxofuranosyl)-adenine;
9-(4-fluoro-2,3-O-isopropylidene-α-L-lyxofuranosyl)-2-fluoroadenine;
9-(4-fluoro-2,3-O-isopropylidene-α-L-lyxofuranosyl)-2-chloroadenine; 9-(4-fluoro-2,3-O-isopropylidene-α-L-lyxofuranosyl)-2-azaadenine;
9-(4-fluoro-2,3-O-isopropylidene-α-L-lyxofuranosyl)-8-aza-9-deazaadenine;
9-(4-fluoro-2,3-O-isopropylidene-α-L-lyxofuranosyl)-7-deazaadenine;
9-(4-fluoro-2,3-O-isopropylidene-α-L-lyxofuranosyl)-8-azaadenine;
9-(4-fluoro-2,3-O-isopropylidene-α-L-lyxofuranosyl)-hypoxanthine;
9-(4-fluoro-2,3-O-isopropylidene-α-L-lyxofuranosyl)-xanthine;
9-(4-fluoro-2,3-O-isopropylidene-α-L-lyxofuranosyl)-guanine;
9-(4-fluoro-2,3-O-isopropylidene-α-L-lyxofuranosyl)-8-azaguanine;
9-(4-fluoro-2,3-O-isopropylidene-α-L-lyxofuranosyl)-7-deazaguanine;
9-(4-fluoro-2,3-O-isopropylidene-α-L-lyxofuranosyl)-6-methylaminopurine;
9-(4-fluoro-2,3-O-isopropylidene-α-L-lyxofuranosyl)-6-dimethylaminopurine;
9-(4-fluoro-2,3-O-isopropylidene-α-L-lyxofuranosyl)-2-amino-6-dimethylaminopurine;
9-(4-fluoro-2,3-O-isopropylidene-α-L-lyxofuranosyl)-2-amino-6-methylaminopurine; and
9-(4-fluoro-2,3-O-isopropylidene-α-L-lyxofuranosyl)-6-(1-adamantylamino)-purine.

Similarly, by following the same procedure as above, the corresponding 4'-fluoro-2',3'-O-isopropylidene pyrimidine nucleosides for each of the 5'-azido-5'-deoxy-4'-fluoro-2',3'-O-isopropylidene uridine or uridine derivatives or cytidine or cytidine derivatives of Example 6, with the exception of the 4-thiouracil and 2,4-thiouracil derivatives, are also prepared.

Similarly, by following the same procedure as above, the corresponding 2'-deoxy-4'-fluoro pyrimidine nucleosides for each of the 5'-azido-2',5'-dideoxy-4'-fluorouridine or uridine derivatives or cytidine or cytidine derivatives of Example 6 are also prepared.

Similarly, by following the same procedure as above, the corresponding 4'-fluoro nucleosides for each of the 5'-azido-5'-deoxy-4'-fluoro nucleoside derivatives of Example 6a are also prepared.

EXAMPLE 8a

This Example illustrates a method of preparing the 4'-fluoro nucleosides of this invention from the corresponding 5'-azido-5'-deoxy-4'-fluoro nucleosides. In this Example, 8 mmole of 5'-azido-5'-deoxy-4'-fluoro-2',3'-O-isopropylidene-uridine are dissolved in 60 ml. of acetonitrile at 0°C. 13 mmoles of $NOBF_4$ are then added under anhydrous conditions and the reaction is kept 15 minutes at 0°C, then warmed up to 15°C and after 40 minutes cooled back to 0°C for 20 minutes. The solution is neutralized with a saturated solution of $Na_2HPO_4$ and finally with 1/10 M NaOH until a pH 5 is reached. The solution is partitioned with chloroform. The chloroform extracts are filtered and evaporated to dryness. The residue is treated with 1/100M HCl in 25 ml. of methanol/water (4:1 vol/vol ratio) for 90 minutes. Neutralization with methanolic ammonia followed by evaporation under vacuum gives a gum which is purified by chromatography on silica gel giving 4-fluoro-2',3'-O-isopropylidene uridine.

Similarly, by following the same procedure as above using the corresponding 5'-azido-5'-deoxy-4'-fluoronucleosides of Example 6, the following compounds are prepared:

9-(4-fluoro-2,3-O-isopropylidene-β-D-ribofuranosyl)-6-methylthiopurine;
9-(4-fluoro-2,3-O-isopropylidene-β-D-ribofuranosyl)hypoxanthine;
9-(4-fluoro-2,3-O-isopropylidene-β-D-ribofuranosyl)xanthine;
9-(4-fluoro-2,3-O-isopropylidene-β-D-ribofuranosyl)-6-mercaptopurine;
9-(4-fluoro-2,3-O-isopropylidene-α-L-lyxofuranosyl)-6-methylthiopurine;
9-(4-fluoro-2,3-O-isopropylidene-α-L-lyxofuranosyl)hypoxanthine;
9-(4-fluoro-2,3-O-isopropylidene-α-L-lyxofuranosyl)xanthine;
9-(4-fluoro-2,3-O-isopropylidene-α-L-lyxofuranosyl)-6-mercaptopurine;
4'-fluoro-2',3'-O-isopropylidene-5-aza-uridine;
4'-fluoro-2',3'-O-isopropylidene-5-fluorouridine;
4'-fluoro-2',3'-O-isopropylidene-5-chlorouridine;
4'-fluoro-2',3'-O-isopropylidene-5-bromouridine;
4'-fluoro-2',3'-O-isopropylidene-5-iodouridine;
4'-fluoro-2',3'-O-isopropylidene-thymidine;
4'-fluoro-2',3'-O-isopropylidene-5-trifluoromethyluridine;
4'-fluoro-2',3'-O-isopropylidene-5-hydroxymethyluridine;
4'-fluoro-2',3'-O-isopropylidene-5-nitro-uridine;
4'-fluoro-2',3'-O-isopropylidene-2-thiouridine;
4'-fluoro-2',3'-O-isopropylidene-4-thiouridine;
4'-fluoro-2',3'-O-isopropylidene-2,4-dithiouridine;
4'-fluoro-2',3'-O-isopropylidene-6-aza-uridine;
4'-fluoro-2',3'-O-isopropylidene-5-methyl-6-aza-uridine;
4'-fluoro-2',3'-O-isopropylidene-5-dimethylaminopurine;
1-(2-deoxy-4-fluoro-β-D-erythropento-furanosyl)-uracil;
1-(2-deoxy-4-fluoro-β-D-erythropento-furanosyl)-5-fluorouracil;
1-(2-deoxy-4-fluoro-β-D-erythropento-furanosyl)-5-chlorouracil;
1-(2-deoxy-4-fluoro-β-D-erythropento-furanosyl)-5-bromouracil;
1-(2-deoxy-4-fluoro-β-erythropento-furanosyl)-5-iodouracil; and
1-(2-deoxy-4-fluoro-β-D-erythropento-furanosyl)-thymine.

EXAMPLE 9

This Example illustrates methods of removing 2',3'-O-alkylidene protecting groups from the corresponding 2',3'-O-alkylidene protected 4'-fluoro compounds of this invention. In this Example, 1 mmole of 4'-fluoro-2',3'-O-isopropylideneadenosine is dissolved in 90% trifluoroacetic acid and allowed to stand for 0.5 hours at 20°C. The reaction mixture is then evaporated to dryness and the resulting residue is then coevaporated with toluene and methanol to remove residual traces of acid and neutralized with dilute ammonium hydroxide. This residue is then further purified by preparative thin-layer chromatography on silicic acid using mixtures of methanol and ethyl acetate, affording 4'-fluoroadenosine.

Similarly, by following the same procedure as above but using the corresponding 4'-fluoro-2',3'-O-isopropylidene nucleosides of Examples 8 and 8a as starting materials, the following compounds are prepared:

4'-fluoro-2-fluoroadenosine;
4'-fluoro-2-chloroadenosine;
4'-fluoro-2-azaadenosine;
4'-fluoro-8-aza-9-deazaadenosine;
4'-fluoro-7-deazaadenosine;
4'-fluoro-7-deaza-7-cyanoadenosine;
4'-fluoro-8-azaadenosine;
4'-fluoroinosine;
4'-fluoroxanthosine;
9-(4-fluoro-β-D-ribofuranosyl)-6-mercaptopurine;
9-(4-fluoro-β-D-ribofuranosyl)-6-methylthiopurine;
4'-fluoroguanosine;
9-(4-fluoro-β-D-ribofuranosyl)-2-amino-6-mercaptopurine;
9-(4-fluoro-β-D-ribofuranosyl)-2-amino-6-methylthiopurine;
4'-fluoro-8-azaguanosine;
4'-fluoro-7-deazaguanosine;
9-(4-fluoro-β-D-ribofuranosyl)-6-methylaminopurine;
9-(4-fluoro-β-D-ribofuranosyl)-6-dimethylaminopurine;
9-(4-fluoro-β-D-ribofuranosyl)-2-amino-6-methylaminopurine;
9-(4-fluoro-β-D-ribofuranosyl)-2-amino-6-dimethylaminopurine;
9-(4-fluoro-β-D-ribofuranosyl)-6-(1-adamantylamino)-purine;
9-(4-fluoro-α-L-lyxofuranosyl)adenine;
9-(4-fluoro-α-L-lyxofuranosyl)-2-fluoroadenine;
9-(4-fluoro-α-L-lyxofuranosyl)-2-chloroadenine;
9-(4-fluoro-α-L-lyxofuranosyl)-2-azaadenine;
9-(4-fluoro-α-L-lyxofuranosyl)-8-aza-9-deazaadenine;
9-(4-fluoro-α-L-lyxofuranosyl)-7-deazaadenine;
9-(4-fluoro-α-L-lyxofuranosyl)-7-deaza-7-cyanoadenine;
9-(4-fluoro-α-L-lyxofuranosyl)-8-azaadenine;
9-(4-fluoro-α-L-lyxofuranosyl)-hypoxanthine;
9-(4-fluoro-α-L-lyxofuranosyl)-xanthine;
9-(4-fluoro-α-L-lyxofuranosyl)-6-mercaptopurine;
9-(4-fluoro-α-L-lyxofuranosyl)-6-methylthiopurine;

9-(4-fluoro-α-L-lyxofuranosyl)-guanine;
9-(4-fluoro-α-L-lyxofuranosyl)-2-amino-6-mercaptopurine;
9-(4-fluoro-α-L-lyxofuranosyl)-2-amino-6-methylthiopurine;
9-(4-fluoro-α-L-lyxofuranosyl)-8-azaguanine;
9-(4-fluoro-α-L-lyxofuranosyl)-7-deazaguanine;
9-(4-fluoro-α-L-lyxofuranosyl)-6-methylaminopurine;
9-(4-fluoro-α-L-lyxofuranosyl)-6-dimethylaminopurine;
9-(4-fluoro-α-L-lyxofuranosyl)-2-amino-6-methylaminopurine;
9-(4-fluoro-α-L-lyxofuranosyl)-2-amino-6-dimethylaminopurine; and
9-(4-fluoro-α-L-lyxofuranosyl)-6-(1-adamantylamino)-purine.

In a similar manner, starting from 4'-fluoro-2',3'-O-isopropylideneuridine and derivatives thereof of Examples 8 and 8a, and 4'-fluoro-2',3'-O-isopropylidenecytidine and derivatives thereof of Examples 8 and 8a, the following compounds are prepared:

4'-fluoro-uridine;
4'-fluoro-5-aminouridine;
4'-fluoro-5-methylaminouridine;
4'-fluoro-5-dimethylaminouridine;
4'-fluoro-5-fluorouridine;
4'-fluoro-5-bromouridine;
4'-fluoro-5-chlorouridine;
4'-fluoro-5-iodouridine;
4'-fluoro-5-methyluridine;
4'-fluoro-5-butyluridine;
4'-fluoro-5-isopropyluridine;
4'-fluoro-5-trifluoromethyluridine;
4'-fluoro-5-hydroxymethyluridine;
4'-fluoro-5-nitrouridine;
4'-fluoro-5-azauridine;
4'-fluoro-6-azauridine;
4'-fluoro-5-methyl-6-azauridine;
4'-fluoro-2-thiouridine;
4'-fluoro-4-thiouridine;
4'-fluoro-2,4-dithiouridine;
4'-fluoro-cytidine;
4'-fluoro-5-fluorocytidine;
4'-fluoro-5-chlorocytidine;
4'-fluoro-5-bromocytidine;
4'-fluoro-5-iodocytidine;
4'-fluoro-5-methylcytidine;
4'-fluoro-5-butylcytidine;
4'-fluoro-5-isopropylcytidine;
4'-fluoro-5-trifluoromethylcytidine;
4'-fluoro-5-hydroxymethylcytidine;
4'-fluoro-5-nitrocytidine;
4'-fluoro-5-azacytidine;
4'-fluoro-6-azacytidine;
4'-fluoro-5-methyl-6-azacytidine;
1-(4-fluoro-α-L-lyxofuranosyl)-5-aminocytosine;
1-(4-fluoro-α-L-lyxofuranosyl)-5-methylaminocytosine;
1-(4-fluoro-α-L-lyxofuranosyl)uracil;
1-(4-fluoro-α-L-lyxofuranosyl)-5-fluorouracil;
1-(4-fluoro-α-L-lyxofuranosyl)-5-bromouracil;
1-(4-fluoro-α-L-lyxofuranosyl)-5-chlorouracil;
1-(4-fluoro-α-L-lyxofuranosyl)-5-iodouracil;
1-(4-fluoro-α-L-lyxofuranosyl)-5-methyluracil;
1-(4-fluoro-α-L-lyxofuranosyl-5-butyluracil;
1-(4-fluoro-α-L-lyxofuranosyl)-5-trifluoromethyluracil;
1-(4-fluoro-α-L-lyxofuranosyl)-5-hydroxymethyluracil;
1-(4-fluoro-α-L-lyxofuranosyl)-5-nitrouracil;
1-(4-fluoro-α-L-lyxofuranosyl)-5-azauracil;
1-(4-fluoro-α-L-lyxofuranosyl)-6-azauracil;
1-(4-fluoro-α-L-lyxofuranosyl)-5-methyl-6-azauracil;
1-(4-fluoro-α-L-lyxofuranosyl)-2-thiouracil;
1-(4-fluoro-α-L-lyxofuranosyl)-4-thiouracil;
1-(4-fluoro-α-L-lyxofuranosyl)-2,4-dithiouracil;
1-(4-fluoro-α-L-lyxofuranosyl)-cytosine;
1-(4-fluoro-α-L-lyxofuranosyl)-5-fluorocytosine;
1-(4-fluoro-α-L-lyxofuranosyl)-5-chlorocytosine;
1-(4-fluoro-α-L-lyxofuranosyl)-5-bromocytosine;
1-(4-fluoro-α-L-lyxofuranosyl)-5-iodocytosine;
1-(4-fluoro-α-L-lyxofuranosyl)-5-methylcytosine;
1-(4-fluoro-α-L-lyxofuranosyl)-5-butylcytosine;
1-(4-fluoro-α-L-lyxofuranosyl)-5-isopropylcytosine;
1-(4-fluoro-α-L-lyxofuranosyl)-5-trifluoromethylcytosine;
1-(4-fluoro-α-L-lyxofuranosyl)-5-hydroxymethyl;
1-(4-fluoro-α-L-lyxofuranosyl)-5-nitrocytosine;
1-(4-fluoro-α-L-lyxofuranosyl)-5-azacytosine;
1-(4-fluoro-α-L-lyxofuranosyl)-6-azacytosine;
1-(4-fluoro-α-L-lyxofuranosyl)-5-methyl-6-azacytosine;
1-(4-fluoro-α-L-lyxofuranosyl)-2-thiocytosine; and
1-(4-fluoro-α-L-lyxofuranosyl)-5-dimethylaminocytosine.

EXAMPLE 10

This Example illustrates methods of preparing the 4'-fluoro-5'-O-sulfamoyl nucleosides of this invention. In this Example, 5 mmoles of 4'-fluoro-2',3'-O-isopropylideneuridine, prepared according to Examples 8 or 8a, is dissolved in 50 ml. of dioxane and stirred in the presence of molecular sieves 4A and 500W. 10 mmoles of sulfamoyl chloride are added to the reaction mixture and the reaction is allowed to stand at 20°C for 48 hours. The reaction mixture is filtered and the filtrate evaporated to dryness. The resulting residue is dissolved in 20 ml. of 90% trifluoroacetic acid and allowed to stand for 0.5 hours at 20°C. This reaction mixture is in turn evaporated to dryness and the residue is coevaporated with toluene and methanol and neutralized with dilute ammonium hydroxide. This residue is further purified by thinlayer chromatography using mixture of chloroform and methanol. The appropriate band is eluted with methanol, concentrated by evaporation and precipitated with ethyl ether affording a precipitate of pure 4'-fluoro-5'-O-sulfamoyluridine.

By following the same procedure as above using the 4'-fluoro-2',3'-O-isopropylidenenucleoside products of Examples 8, 8a, 14 or 15 as starting materials, the corresponding 5'-O-sulfamoyl compounds, including the following, are prepared:

4'-fluoro-5'-O-sulfamoyl-5-fluorouridine;
4'-fluoro-5'-O-sulfamoyl-5-chlorouridine;
4'-fluoro-5'-O-sulfamoyl-5-bromouridine;
4'-fluoro-5'-O-sulfamoyl-5-iodouridine;
4'-fluoro-5'-O-sulfamoyl-5-trifluoromethyluridine;
4'-fluoro-5'-O-sulfamoyl-5-hydroxymethyluridine;
4'-fluoro-5'-O-sulfamoyl-5-aminouridine;
4'-fluoro-5'-O-sulfamoyl-6-azauridine;
4'-fluoro-5'-O-sulfamoyl-2-chloroadenosine;
4'-fluoro-5'-O-sulfamoyl-5-nitrouridine;
4'-fluoro-5'-O-sulfamoylcytidine;
4'-fluoro-5'-O-sulfamoyl-5-fluorocytidine;

4'-fluoro-5'-O-sulfamoyl-5-chlorocytidine;
4'-fluoro-5'-O-sulfamoyl-5-bromocytidine;
4'-fluoro-5'-O-sulfamoyl-5-iodocytidine;
4'-fluoro-5'-O-sulfamoyl-5-trifluoromethylcytidine;
4'-fluoro-5'-O-sulfamoyl-5-hydroxymethylcytidine;
4'-fluoro-5'-O-sulfamoyl-5-nitrocytidine;
4'-fluoro-5'-O-sulfamoyl-5-aminocytidine;
4'-fluoro-5'-O-sulfamoyl-4-hydroxyaminocytidine;
9-(4-fluoro-5-O-sulfamoyl-$\beta$-D-ribofuranosyl)-6-mercaptopurine;
9-(4-fluoro-5-O-sulfamoyl-$\beta$-D-ribofuranosyl)-6-methylthiopurine;
9-(4-fluoro-5-O-sulfamoyl-$\beta$-D-ribofuranosyl)-2-amino-6-mercaptopurine; and
9-(4-fluoro-5-O-sulfamoyl-$\beta$-D-ribofuranosyl)-2-amino-6-methylthiopurine.

EXAMPLE 10a

This Example illustrates further methods of preparing 3'-O-acetyl-2'-deoxy-4'-fluoro-5'-O-sulfamoyl nucleosides of this invention. In this Example, 1 mmole of 4'-fluorothymidine obtained in Example 8 is dissolved in 20 ml. of pyridine and treated with 1.1 mmole of monomethoxy tritylchloride at 20°C. for 18 hours, then 10 mmoles of acetic anhydride are added and the reaction is continued for another 24 hours. The reaction mixture is quenched by the addition of 5 ml. of methanol and the solvent is removed under vacuum. The residue is partitioned between water and chloroform and the chloroform extracts are combined and evaporated to dryness. The residue is hydrolyzed in the presence of 20 ml. of 90% formic acid for 1 hour at 20°C. The reaction mixture is evaporated to dryness and the residue thoroughly dried by coevaporation in the presence of toluene and benzene to afford 3'-O-acetyl-4'-fluorothymidine. The dried residue is dissolved in 10 ml. of dioxane and stirred in the presence of molecular sieves 4A and 500W. 10 mmoles of sulfamoyl chloride are added to the reaction mixture which is allowed to stand at 20°C. for 48 hours. The reaction mixture is then evaporated to dryness. The residue is purified by thin layer chromatography using mixtures of chloroform and methanol. 3'-O-acetyl-4'-fluoro-5'-O-sulfamoyl-thymidine is eluted with methanol, concentrated by evaporation and then precipitated with ethyl ether.

By following the same procedure as above, but using the corresponding 2'deoxy-4'-fluoropyrimidine nucleoside products of Example 8 or 8a as starting materials, the following compounds are prepared:
3'-O-acetyl-2'-deoxy-4'-fluoro-5'-O-sulfamoyl-uridine;
3'-O-acetyl-2'-deoxy-4'-fluoro-5'-O-sulfamoyl-5-fluorouridine;
3'-O-acetyl-2'-deoxy-4'-fluoro-5'-O-sulfamoyl-5-chlorouridine;
3'-O-acetyl-2'-deoxy-4'-fluoro-5'-O-sulfamoyl-5-bromouridine;
3'-O-acetyl-2'-deoxy-4'-fluoro-5'-O-sulfamoyl-5-iodouridine;
$N^4$,3'-O-diacetyl-2'-deoxy-4'-fluoro-5'-O-sulfamoyl-cytidine;
$N^4$,3'-O-diacetyl-2'-deoxy-4'-fluoro-5'-O-sulfamoyl-5-fluorocytidine;
$N^4$,3'-O-diacetyl-2'-deoxy-4'-fluoro-5'-O-sulfamoyl-5-chlorocytidine;
$N^4$3'-O-diacetyl-2'-deoxy-4'-fluoro-5'-O-sulfamoyl-5-bromocytidine; and
$N^4$,3'-O-diacetyl-2'-deoxy-4'-fluoro-5'-O-sulfamoyl-5-iodocytidine.

In the course of preparing these compounds 3'-O-acetyl-2'-deoxy-4'-fluoro pyrimidine nucleosides corresponding to the compounds listed above are also prepared.

The acetyl protecting groups in the compounds listed above are removed by treatment with concentrated ammonium hydroxide in methanol (1:1 vol/vol. ratio) for one hour at 20°C to afford the following compounds:
2'-deoxy-4'-fluoro-5'-O-sulfamoyluridine;
2'-deoxy-4'-fluoro-5'-O-sulfamoyl-5-fluorouridine;
2'-deoxy-4'-fluoro-5'-O-sulfamoyl-5-chlorouridine;
2'-deoxy-4'-fluoro-5'-O-sulfamoyl-5-bromouridine;
2'-deoxy-4'-fluoro-5'-O-sulfamoyl-5-iodouridine;
2'-deoxy-4'-fluoro-5'-O-sulfamoylcytidine;
2'-deoxy-4'-fluoro-5'-O-sulfamoyl-5-fluorocytidine;
2'-deoxy-4'-fluoro-5'-O-sulfamoyl-5-chlorocytidine;
2'-deoxy-4'-fluoro-5'-O-sulfamoyl-5-bromocytidine;
2'-deoxy-4'-fluoro-5'-O-sulfamoyl-5-iodocytidine; and
2'-deoxy-4'-fluoro-5'-O-sulfamoyl-thymidine.

EXAMPLE 11

This Example illustrates methods of preparing 4'-fluoro-5'-O-(N-lower alkylsulfamoyl)nucleosides and further methods of preparing 4'-fluoro-5'-sulfamoyl nucleosides. In this Example, 1 mmole of 4'-fluoro-2',-3'-O-isopropylideneadenosine is dissolved in 25 ml. of benzene and 2 mmoles of bis-(tributyltin) oxide are added. The reaction mixture is refluxed for two hours (with azeotropic removal of water). The reaction is cooled to +5°C and 4 mmoles of sulfamoylchloride in 5 ml. of dioxane are added dropwise. The solution is stirred 10 minutes at 20°C. and evaporated to dryness. The residue is extracted with hot hexane to remove soluble tin compounds, the solution is evaporated to dryness and the residue purified by chromatography over silica gel. The product is eluted with 10% methanol in chloroform. The fraction containing the desired nucleoside is pooled and evaporated to dryness. The residue is treated with 10 ml. of 90% trifluoroacetic acid for 0.5 hours then evaporated to dryness. The residue is dissolved in 10 ml. of a mixture of methanol and ammonium hydroxide (1:1 vol/vol), and evaporated to dryness. The residue is purified by preparative thin-layer chromatography using a mixture of $CHCl_3$ and MeOH as elutant. The U.V. band corresponding to the nucleoside is extracted and crystallized from water affording 4'-fluoro-5'-O-sulfamoyladenosine.

By following the above procedure, using the corresponding 4'-fluoro-2',3'-O-isopropylidene nucleosides as starting materials the 4'-fluoro-5'-O-sulfamoyl nucleosides prepared in Example 10 and 12 are prepared again.

Similarly, by following the same procedure as above but using N-methylsulfamoylchloride in place of sulfamoylchloride, the corresponding 4'-fluoro-5'-(N-methylsulfamoyl)nucleoside derivatives of the above products are also prepared.

Similarly, by following the same procedure as above, but using N,N-dimethylsulfamoylchloride in place of sulfamoylchloride, the corresponding 5'-(N,N-dimethylsulfamoyl) derivatives of each of the above 4'-fluoro nucleoside products are also prepared.

Similarly, by following the same procedure as above but respectively using the products enumerated in Example 16 below as starting materials, the corresponding 5'-O-sulfamoyl; 5'-O-(N-methylsulfamoyl); and 5'-O-(N,N-dimethylsulfamoyl) derivatives of each product of Example 16 are prepared, e.g., 1-(4-fluoro-5-O-sulfamoyl-β-D-ribofuranosyl)-4-hydroxyaminopyrimidine-2-one; 1-[4-fluoro-5-O-(N-methylsulfamoyl)-β-D-ribofuranosyl]-4-hydroxyaminopyrimidin-2-one; and 1-[4-fluoro-5-O-(N,N'-dimethylsulfamoyl)-β-D-ribofuranosyl]-4-hydroxylaminopyrimidin-2-one.

EXAMPLE 12

This Example illustrates further methods of preparing 4'-fluoro-5'-O-sulfamoyl nucleosides of this invention. In this Example, 30 mmoles of sodium hydroxide are added to a suspension containing 15 mmoles of 4'-fluoro-2',3'-O-isopropylidene adenosine in 150 ml. of 1,2-dimethoxyethane at 20°C. The suspension is stirred for 2 hours at 20°C, cooled to 0°C, and 30 ml. of 1,2-dimethoxyethane containing 30 mmoles of sulfamoyl chloride are added dropwise over a period of 15 minutes with constant stirring. The resulting suspension mixture is stirred at 5°C for 20 hours and 10 ml. of absolute ethanol are added. The solvents are removed by vacuum evaporation and 250 ml. of ethanol are added to the residue resulting in a suspension which is filtered. The filtrate is evaporated to dryness and the resulting residue is purified by thin-layer chromatography over a silica gel eluting with methanol-chloroform(1:9) affording an eluate fraction containing 4'-fluoro-2',3'-O-isopropylidene-5'-O-sulfamoyladenosine, which is evaporated to dryness. The resulting residue, a clear syrup, is dissolved in 100 ml. of 80% aqueous formic acid and allowed to stand for 24 hours at 20°C. This mixture is evaporated to dryness and the resulting residue triturated with ethyl ether affording a powder of pure 4'-fluoro-5'-O-sulfamoyladenosine.

Similarly, by following the same procedure as above but using the corresponding 4'-fluoro-2',3'-O-isopropylidene nucleoside products of Examples 8, 8a and 15 (below) as starting materials, the following compounds are prepared:

4'-fluoro-5'-O-sulfamoyluridine;
4'-fluoro-5'-O-sulfamoyl-8-aza-9-deazaadenosine;
4'-fluoro-5'-O-sulfamoyl-7-deazaadenosine;
4'-fluoro-5'-O-sulfamoyl-7-deaza-7-cyanoadenosine;
4'-fluoro-5'-O-sulfamoyl-8-azaadenosine;
4'-fluoro-5'-O-sulfamoylinosine;
9-(4-fluoro-5-O-sulfamoyl-β-D-ribofuranosyl)-6-mercaptopurine;
9-(4-fluoro-5-O-sulfamoyl-β-D-ribofuranosyl)-6-methylthiopurine;
4'-fluoro-5'-O-sulfamoylxanthosine;
9-(4-fluoro-5-O-sulfamoyl-β-D-ribofuranosyl)-2-amino-6-mercaptopurine;
9-(4-fluoro-5-O-sulfamoyl-β-D-ribofuranosyl)-2-amino-6-methylthiopurine;
4'-fluoro-5'-O-sulfamoylguanosine;
4'-fluoro-5'-O-sulfamoyl-8-azaguanosine;
4'-fluoro-5'-O-sulfamoyl-7-deazaguanosine;
4'-fluoro-5'-O-sulfamoyl-5-methyluridine;
4'-fluoro-5'-O-sulfamoyl-5-aminouridine;
4'-fluoro-5'-O-sulfamoyl-5-butyluridine;
4'-fluoro-5'-O-sulfamoyl-5-azauridine;
4'-fluoro-5'-O-sulfamoyl-6-aza-5-methyluridine;
4'-fluoro-5'-O-sulfamoyl-2-thiouridine;
4'-fluoro-5'-O-sulfamoyl-4-thiouridine;
4'-fluoro-5'-O-sulfamoyl-2,4-dithiouridine;
4'-fluoro-5'-O-sulfamoyl-5-methylaminouridine;
4'-fluoro-5'-O-sulfamoyl-5-dimethylaminouridine;
4'-fluoro-5'-O-sulfamoylcytidine;
4'-fluoro-5'-O-sulfamoyl-5-ethylcytidine;
4'-fluoro-5'-O-sulfamoyl-5-aminocytidine;
4'-fluoro-5'-O-sulfamoyl-5-butylcytidine;
4'-fluoro-5'-O-sulfamoyl-5-azacytidine;
4'-fluoro-5'-O-sulfamoyl-6-azacytidine;
4'-fluoro-5'-O-sulfamoyl-6-aza-5-methylcytidine;
4'-fluoro-5'-O-sulfamoyl-2-thiocytidine;
4'-fluoro-5'-O-sulfamoyl-5-methylaminocytidine;
4'-fluoro-5'-O-sulfamoyl-5-dimethylaminocytidine;
1-(4-fluoro-5-O-sulfamoyl-β-D-ribofuranosyl)-4-hydroxylaminopyrimidin-2-one;
1-(4-fluoro-5-O-sulfamoyl-β-D-ribofuranosyl)-4-hydroxylamino-5-fluoropyrimidin-2-one;
1-(4-fluoro-5-O-sulfamoyl-β-D-ribofuranosyl)-4-hydroxylamino-5-ethylpyrimidin-2-one;
1-(4-fluoro-5-O-sulfamoyl-β-D-ribofuranosyl)-4-hydroxylamino-5-trifluoromethylpyrimidin-2-one;
4'-fluoro-5'-O-sulfamoyl-2-fluoroadenosine;
4'-fluoro-5'-O-sulfamoyl-2-azaadenosine;
4'-fluoro-5'-O-sulfamoyl-6-azauridine;
4'-fluoro-5'-O-sulfamoyl-2-chloroadenosine;
6-methylamino-9-(4-fluoro-5-O-sulfamoyl-β-D-ribofuranosyl)-purine;
6-dimethylamino-9-(4-fluoro-5-O-sulfamoyl-β-D-ribofuranosyl)-purine; and
6-(1-adamantylamino)-9-(4-fluoro-5-O-sulfamoyl-β-D-ribofuranosyl)-purine.

Similarly, by following the same procedure as above using the corresponding α-L-lyxofuranosyl starting materials, the corresponding 4'-fluoro-5'-O-sulfamoyl-α-L-lyxofuranosyl nucleosides are prepared.

EXAMPLE 13

This Example illustrates further procedures for preparing 4'-fluoro-nucleoside-5'-phosphates. In this Example, 1 mmole of 4'-fluoro-2',3'-O-isopropylideneuridine is dissolved in 5 ml. of pyridine containing 1.1 mmoles of bis(trichloroethyl)phosphate and 2.5 mmoles of p-toluenesulfonyl chloride. The reaction is held at 20°C for 16 hours, then 1 ml. of water is added and the hydrolysis is continued for 30 minutes at 20°C. 5 ml. of a saturated sodium bicarbonate solution are added and the reaction mixture is evaporated almost to dryness. The residue is partitioned between chloroform and water. The chloroformic phase is dried over magnesium sulfate, filtered and evaporated to dryness. The residue is dissolved in 10 ml. of 90% formic acid. The hydrolysis is allowed to proceed for 3 ½ hours, then the reaction mixture is evaporated to dryness. The residue is dissolved in 1% methanolic ammonia and re-evaporated to dryness. The residue is dissolved in 10 ml. of dimethylformamide containing 20 mmoles of zinc dust. The suspension is stirred while 40 mmoles of acetic acid are slowly added thereto. After 25 minutes the reaction is complete. The suspension is evaporated to dryness, the residue is dissolved in 20 ml. of water and passed through a column of Dowex 50 NH$_4^+$ resin. The effluent is adjusted to pH 8 with barium hydroxide and 2 ml. of 1 M aqueous barium acetate is added. Addition of two volumes of ethanol then precipitate the barium salt of 4'-fluorouridine-5'-phosphate.

By following the same procedure as above using the products of Examples 8 or 8a as starting materials, the following 4'-fluoro-pyrimidine and purine nucleoside 5'-phosphates and 4'-fluoro-2'-deoxyribopyrimidine nucleoside 5'-phosphates are prepared:

4'-fluoro-5-fluorouridine-5'-phosphate;
4'-fluoro-5-chlorouridine-5'-phosphate;
4'-fluoro-5-bromouridine-5'-phosphate;
4'-fluoro-5-iodouridine-5'-phosphate;
4'-fluoro-5-methyluridine-5'-phosphate;
4'-fluoro-5-isopropyluridine-5'-phosphate;
4'-fluoro-5-butyluridine-5'-phosphate;
4'-fluoro-5-trifluoromethyluridine-5'-phosphate;
4'-fluoro-5-nitrouridine-5'-phosphate;
4'-fluoro-5-azauridine-5'-phosphate;
4'-fluoro-6-aza-5-methyluridine-5'-phosphate;
4'-fluoro-2-thiouridine-5'-phosphate;
4'-fluoro-2-thiouridine-5'-phosphate;
4'-fluoro-2,4-dithiouridine-5'-phosphate;
4'-fluorocytidine-5'-phosphate;
4'-fluoro-5-fluorocytidine-5'-phosphate;
4'-fluoro-5-chlorocytidine-5'-phosphate;
4'-fluoro-5-bromocytidine-5'-phosphate;
4'-fluoro-5-iodocytidine-5'-phosphate;
4'-fluoro-5-trifluoromethylcytidine-5'-phosphate;
4'-fluoro-5-ethylcytidine-5'-phosphate;
4'-fluoro-5-isopropylcytidine-5'-phosphate;
4'-fluoro-5-butylcytidine-5'-phosphate;
4'-fluoro-5-nitrocytidine-5'-phosphate;
4'-fluoro-5-azacytidine-5'-phosphate;
4'-fluoro-6-azacytidine-5'-phosphate;
4'-fluoro-6-aza-5-methylcytidine-5'-phosphate;
4'-fluoro-2-thiocytidine-5'-phosphate;
4'-fluoro-5-methylaminouridine-5'-phosphate;
9-(4-fluoro-β-D-ribofuranosyl)-6-mercaptopurine-5'-phosphate;
9-(4-fluoro-β-D-ribofuranosyl)-6-methylthiopurine-5'-phosphate;
9-(4-fluoro-β-D-ribofuranosyl)-2-amino-6-mercaptopurine-5'-phosphate;
9-(4-fluoro-β-D-ribofuranosyl)-2-amino-6-methylthiopurine-5'-phosphate;
6-methylamino-9-(4-fluoro-β-D-ribofuranosyl)-purine-5'-phosphate;
6-dimethylamino-9-(4-fluoro-β-D-ribofuranosyl)-purine-5'-phosphate;
2-amino-6-dimethylamino-9-(4-fluoro-β-D-ribofuranosyl)-purine-5'-phosphate;
2-amino-6-methylamino-9-(4-fluoro-β-D-ribofuranosyl)-purine-5'-phosphate;
4'-fluoro-5-aminocytidine-5'-phosphate;
4'-fluoro-5-methylaminocytidine-5'-phosphate;
6-(1-adamantylamino)-9-(4-fluoro-β-D-ribofuranosyl)-purine-5'-phosphate;
4'-fluoro-5-dimethylaminocytidine;
4'-fluoro-2-chloroadenosine-5'-phosphate;
4'-fluoro-2-azaadenosine-5'-phosphate;
4'-fluoroadenosine-5'-phosphate;
4'-fluoro-8-aza-7-deazaadenosine-5'-phosphate;
4'-fluoro-7-deazaadenosine-5'-phosphate;
4'-fluoro-7-deaza-7-cyanoedenosine-5'-phosphate;
4'-fluoro-8-azaadenosine-5'-phosphate;
4'-fluoroinosine-5'-phosphate;
4'-fluoroxanthosine-5'-phosphate;
4'-fluoroguanosine-5'-phosphate;
4'-fluoro-8-azaguanosine-5'-phosphate;
4'-fluoro-7-deazaguanosine-5'-phosphate;
9-(4-fluoro-α-L-lyxofuranosy)adenine-5'-phosphate;
9-(4-fluoro-α-L-lyxofuranosyl)-2-fluoroadenine-5'-phosphate;
9-(4-fluoro-α-L-lyxofuranosyl)-2-chloroadenine-5'-phosphate;
9-(4-fluoro-α-L-lyxofuranosyl)-2-azaadenine-5'-phosphate;
9-(4-fluoro-α-L-lyxofuranosyl)-8-aza-9-deazaadenine-5'-phosphate;
9-(4-fluoro-α-L-lyxofuranosyl)-7-deazaadenine-5'-phosphate;
9-(4-fluoro-α-L-lyxofuranosyl)-7-deaza-7-cyanoadenine-5'-phosphate;
9-(4-fluoro-α-L-lyxofuranosyl)-8-azaadenine-5'-phosphate;
9-(4-fluoro-α-L-lyxofuranosyl)-hypoxanthine-5'-phosphate;
9-(4-fluoro-α-L-lyxofuranosyl)-xanthine 5'-phosphate;
9-(4-fluoro-α-L-lyxofuranosyl)-guanine-5'-phosphate;
9-(4-fluoro-α-L-lyxofuranosyl)-8-azaguanine-5'-phosphate;
9-(4-fluoro-α-L-lyxofuranosyl)-7-deazaguanine-5'-phosphate;
6-methylamino-9-(4-fluoro-α-L-lyxofuranosyl)-purine-5'-phosphate;
6-dimethylamino-9-(4-fluoro-α-L-lyxofuranosyl)-purine-5'-phosphate;
2-amino-6-dimethylamino-9-(4-fluoro-α-L-lyxofuranosyl)-purine-5'-phosphate;
2-amino-6-methylamino-9-(4-fluoro-α-L-lyxofuranosyl)purine-5'-phosphate;
4'-fluoro-5-aminouridine-5'-phosphate;
4'-fluoro-5-dimethylaminouridine-5'-phosphate;
6-(1-adamantylamino)-9-(4-fluoro-α-L-lyxofuranosyl)-purine-5'-phosphate;
1-(2-deoxy-4-fluoro-erythropentofuranosyl)-uracil-5'-phosphate;
1-(2-deoxy-4-fluoro-erythropentofuranosyl)-5-fluorouracil-5'-phosphate;
1-(2-deoxy-4-fluoro-erythropentofuranosyl)-5-chlorouracil-5'-phosphate;
1-(2-deoxy-4-fluoro-erythropentofuranosyl)-5-bromouracil-5'-phosphate;
1-(2-deoxy-4-fluoro-erythropentofuranosyl)-5-iodouracil-5'-phosphate;
1-(2-deoxy-4-fluoro-erythropentofuranosyl)-thymine-5'-phosphate;
1-(2-deoxy-4-fluoro-erythropentofuranosyl)-cytosine-5'-phosphate;
1-(2-deoxy-4-fluoro-erythropentofuranosyl)-5-fluorocytosine-5'-phosphate;
1-(2-deoxy-4-fluoro-erythropentofuranosyl)-5-chlorocytosine-5'-phosphate;
1-(2-deoxy-4-fluoro-erythropentofuranosyl)-5-bromocytosine-5'-phosphate; and
1-(2-deoxy-4-fluoro-erythropentofuranosyl)-5-iodocytorsine-5'-phosphate.

By following the same procedure as above, using 1-(4-fluoro-2,3-O-isopropylidene-α-L-lyxofuranosyl)-pyrimidine nucleosides of Example 8 and 8a as starting materials, the corresponding α-L-lyxofuranosyl-4'-phosphate derivatives are prepared.

EXAMPLE 14

This Example illustrates methods of preparing the 4'-fluoro-5'amino pyrimidine nucleosides of this invention. In this Example 300 mg. of palladium impregnated charcoal are added to a solution containing 1 mmole of 4'-fluoro-2',3'-O-isopropylidene-5-nitrouridine (prepared according to Example 8 or 8a) in 10 ml. of methanol. The reaction mixture is stirred and maintained under one atmosphere of hydrogen pressure for 3 hours at 20°C. The reaction mixture is filtered and the filtrate is evaporated to dryness. The resulting residue is purified by preparative thin-layer chromatography yielding 4'-fluoro-2',3'-O-isopropylidene-5-aminouridine.

Similarly, 4'-fluoro-2',3'-O-isopropylidene-5-aminocytidine is prepared according to the same procedure but using 4'-fluoro-2',3'-O-isopropylidene-5-nitrocytidine in place of 4'-fluoro-2',3'-O-isopropylidene-5-nitrouridine.

The compounds obtained above in this Example 14 are treated with 90% formic acid at 20°C for 10 hours to afford 4'-fluoro-5-aminouridine; and 4'-fluoro-5-aminocytidine, respectively.

EXAMPLE 15

This Example illustrates methods of preparing the 4'-fluoro-4-hydroxylamino-pyrimidin-2-one nucleosides of this invention. In this Example 20 mmoles of 4'-fluoro-2',3'-O-isopropylidene-cytidine, prepared according to Example 8, are dissolved in 15 ml. of water containing 2.76 g. of $NH_2OH \cdot HCl$. The solution is allowed to stand at 20°C until crystallization is observed to occur. The crystals are recovered by filtration, washed with methanol, and dried affording 1-(4-fluoro-2,3-O-isopropylidene-β-D-ribofuranosyl)-4-hydroxylamino-pyrimidin-2-one.

Similarly, by following the same procedure as above but using the corresponding 4'-fluoro-cytidine derivatives enumerated in Example 8, the following compounds are respectively prepared:

1-(4-fluoro-2,3-O-isopropylidene-β-D-ribofuranosyl)-4-hydroxylamino-5-fluoropyrimidin-2-one;

1-(4-fluoro-2,3-O-isopropylidene-β-D-ribofuranosyl)-4-hydroxylamino-5-chloropyrimidin-2-one;

1-(4-fluoro-2,3-O-isopropylidene-β-D-ribofuranosyl)-4-hydroxylamino-5-bromopyrimidin-2-one;

1-(4-fluoro-2,3-O-isopropylidene-β-D-ribofuranosyl)-4-hydroxylamino-5-iodopyrimidin-2-one;

1-(4-fluoro-2,3-O-isopropylidene-β-D-ribofuranosyl)-4-hydroxylamino-5-ethylpyrimidin-2-one;

1-(4-fluoro-2,3-O-isopropylidene-β-D-ribofuranosyl)-4-hydroxylamino-5-isopropyl-pyrimidin-2-one;

1-(4-fluoro-2,3-O-isopropylidene-β-D-ribofuranosyl)-4-hydroxylamino-5-butylpyrimidin-2-one;

1-(4-fluoro-2,3-O-isopropylidene-β-D-ribofuranosyl)-4-hydroxylamino-5-trifluoromethyl-pyrimidin-2-one;

1-(4-fluoro-2,3-O-isopropylidene-β-D-ribofuranosyl)-4-hydroxylamino-5-hydroxymethyl-pyrimidin-2-one;

1-(4-fluoro-2,3-O-isopropylidene-β-D-ribofuranosyl)-4-hydroxylamino-5-nitropyrimidin-2-one;

1-(4-fluoro-2,3-O-isopropylidene-β-D-ribofuranosyl)-4-hydroxylamino-5-azapyrimidin-2-one;

1-(4-fluoro-2,3-O-isopropylidene-β-D-ribofuranosyl)-4-hydroxylamino-6-azapyrimidin-2-one;

1-(4-fluoro-2,3-O-isopropylidene-β-D-ribofuranosyl)-4-hydroxylamino-5-methyl-6-azapyrimidin-2-one; and 1-(4-fluoro-2,3-O-isopropylidene-β-D-ribofuranosyl)-4-hydroxylamino-pyrimidin-2-thione.

Similarly, by following the same procedure as above, the corresponding 4-fluoro-2,3-O-isopropylidene-α-L-lyxofuranosyl-4-hydroxylaminopyrimidine nucleosides are prepared.

The compounds obtained above in this Example 15 are treated with 90% formic acid at 20°C for 10 hours to afford the corresponding unprotected 1-(4-fluoro-β-D-ribo-or α-L-lyxo-furanosyl)-4-hydroxylamino-5-substituted pyrimidin-2-ones.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A compound selected from the group of compounds having the formulas:

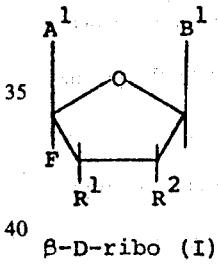

β-D-ribo (I)

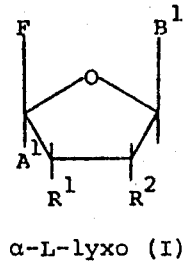

α-L-lyxo (I)

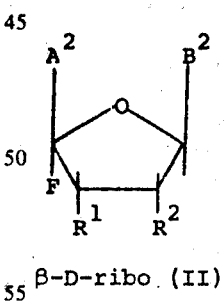

β-D-ribo (II)

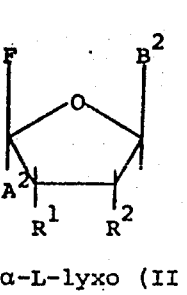

α-L-lyxo (II)

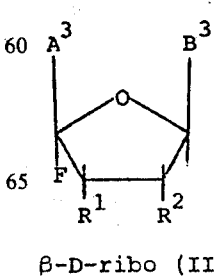

β-D-ribo (III)

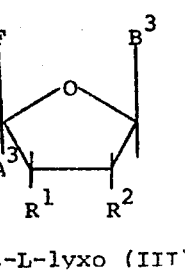

α-L-lyxo (III)

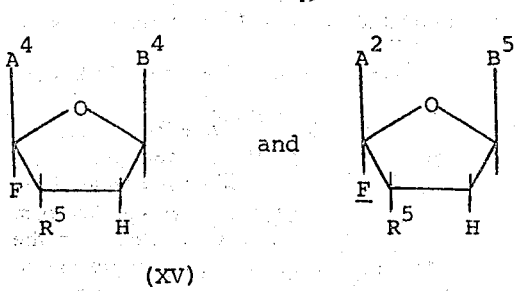

(XV) and (XVI)

wherein R¹ and R² are independently hydroxy or acyloxy having from 2 through 12 carbon atoms, or R¹ and R² together form the group

or

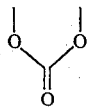

wherein R³ and R⁴ are independently hydrogen, lower alkyl, aryl having from 6 through 12 carbon atoms or together with the carbon atom to which they are joined form a cycloalkyl group having from 5 through 7 ring carbon atoms; A¹ is selected from the group having the formulas: —CH$_2$OH, —CH$_2$N$_3$, —CH$_2$I or —CH$_2$OPO(OH)$_2$; and B¹ is a purine base selected from the group consisting of 6-mercaptopurine, 2-amino-6-lower alkylthiopurine, 6-lower alkylthiopurine, 2-amino-6-mercaptopurine, 6-dimethylaminopurine, 2-amino-6-methylaminopurine, 2-amino-6-dimethylaminopurine, 6-(1-adamantylamino)purine, 7-deazaadenine, hypoxanthine, xanthine, guanine, 8-azaguanine, 7-deazaguanine, adenine, 2-fluoroadenine, 2-chloroadenine, 2-azaadenine, 8-aza-9-deazaadenine, 7-deaza-7-cyanoadenine, and 8-azaadenine; or B¹ is a pyrimidine base selected from the group consisting of cytosine, 5-fluorocytosine, 5-chlorocytosine, 5-bromocytosine, 5-iodocytosine, 5-lower alkyl cytosine, 5-trifluoromethylcytosine, 5-hydroxymethylcytosine, 5-nitrocytosine, 5-azacytosine, 6-azacytosine, 5-methyl-6-azacytosine, 2-thiocytosine, uracil, 5-fluorouracil, 5-chlorouracil, 5-bromouracil, 5-iodouracil, 5-lower alkyluracil, 5-trifluoromethyluracil, 5-hydroxymethyluracil, 5-nitrouracil, 5-azauracil, 6-azauracil, 5-methyl-6-azauracil, 2-thiouracil, 4-thiouracil, 2,4-dithiouracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one, 4-hydroxylamino-5-bromo-pyrimidin-2-one, 4-hydroxylamino-5-chloro-pyrimidin-2-one, 4-hydroxylamino-5-iodo-pyrimidin-2-one, 4-hydroxylamino-5-lower alkylpyrimidin-2-one, 4-hydroxylamino-5-trifluoromethyl-pyrimidin-2-one, 4-hydroxylamino-5-hydroxymethylpyrimidin-2-one, 4-hydroxylamino-5-nitro-pyrimidin-2-one, 4-hydroxylamino-5-aza-pyrimidin-2-one, 4-hydroxylamino-5-methyl-6-aza-pyrimidin-2-one, 4-hydroxylamino-pyrimidin-2-one, and 4-hydroxylamino-pyrimidin-2-thione; A² is selected from the group having the formulas: —CH$_3$ and —CH$_2$NH$_2$; and B² is a purine base selected from the group consisting of 6-dimethylaminopurine, 2-amino-6-methylaminopurine, 2-amino-6-dimethylaminopurine, 6-(1-adamantylamino)purine, 7-deazaadenine, hypoxanthine, xanthine, guanine, 8-azaguanine, 7-deazaguanine, adenine, 2-fluroadenine, 2-chloroadenine, 2-azaadenine, 8-aza-9-deazaadenine, 7-deaza-7-cyanoadenine, and 8-azaadenine; or B² is a pyrimidine base selected from the group consisting of cytosine, 5-fluorocytosine, 5-chlorocytosine, 5-lower alkyl cytosine, 5-trifluoromethylcytosine, 5-hydroxymethylcytosine, 5-azacytosine, 6-azacytosine, 5-methyl-6-azacytosine, uracil, 5-flurouracil, 5-chlorouracil, 5-lower alkyluracil, 5-trifluoromethyluracil, 5-hydroxymethyluracil, 5-azauracil, 6-azauracil, 5-methyl-6-azauracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one, 4-hydroxylamino-5-chloro-pyrimidin-2-one, 4-hydroxylamino-5-lower alkyl pyrimidin-2-one, 4-hydroxylamino-5-hydroxymethyl-pyrimidin-2-one, 4-hydroxylamino-5-aza-pyrimidin-2-one, 4-hydroxylamino-6-aza-pyrimidin-2-one, 4-hydroxylamino-5-methyl-6-aza-pyrimidin-2-one, 4-hydroxylamino-5-trifluoromethylpyrimidin-2-one, and 4-hydroxylamino-pyrimidin-2-one; A³ is selected from the group having the formula

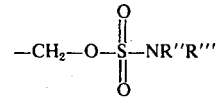

wherein R″ and R‴ are independently hydrogen or lower alkyl having from 1 through 6 carbon atoms; and B³ is a purine base selected from the group consisting of 6-mercaptopurine, 2-amino-6-lower alkylthiopurine, 6-lower alkylthiopurine, 2-amino-6-mercaptopurine, 6-dimethylaminopurine, 2-amino-6-methylaminopurine, 2-amino-6-dimethylaminopurine, 6-(1-adamantylamino)purine, 7-deazaadenine, xanthine, guanine, 8-azaguanine, 7-deazaguanine, 2-fluoroadenine, 2-chloroadenine, 2-azaadenine, 8-aza-9-deazaadenine, 7-deaza-7-cyanoadenine, and 8-azaadenine; or B³ is a pyrimidine base selected from the same group of pyrimidine bases as B¹; wherein A⁴ is —CH$_2$OH, —CH$_2$I, —CH$_2$N$_3$, —CH$_2$OPO(OH)$_2$ or

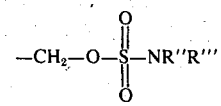

wherein R″ and R‴ are as defined above; B⁴ is a pyrimidine base selected from the group consisting of cytosine, 5-fluorocytosine, 5-chlorocytosine, 5-bromocytosine, 5-iodocytosine, uracil, 5-fluorouracil, 5-chlorouracil, 5-bromouracil, 5-iodouracil, 5-lower alkyl uracil; and R⁵ is hydroxy or an acyloxy group having from 2 through 12 carbon atoms; and B⁵ is a pyrimidine base selected from the group consisting of cytosine, 5-fluorocytosine, 5-chlorocytosine, uracil, 5-fluorouracil, 5-chlorouracil, and 5-lower alkyl uracil; and pharmaceutically acceptable salts of the compounds of formulas, I, II and III.

2. The compound of claim 1 having the Formula I, and pharmaceutically acceptable salts thereof.

3. The compound of claim 2 wherein $R^1$ and $R^2$ are independently hydroxy or benzoyloxy or together form an isopropylidene group, and $B^1$ is selected from the group of purine and pyrimidine bases consisting of 6-(1-adamantylamino)-purine, 6-mercaptopurine, adenine, 2-fluoroadenine, 8-aza-9-deazaadenine, 7-deaza-7-cyanoadenine, 8-azaadenine, cytosine, 5-fluorocytosine, 5-iodocytosine, 5-lower alkyl cytosine, 5-trifluoromethylcytosine, 5-hydroxymethylcytosine, 5-azacytosine, 6-azacytosine, 2-thiocytosine, uracil, 5-fluorouracil, 5-iodouracil, 5-lower alkyluracil, 5-azauracil, 6-azauracil, 4-hydroxylamino-5-fluoro-pyrimidin-2-one, 4-hydroxylamino-5-lower alkyl-pyrimidin-2-one, 4-hydroxylamino-5-trifluoromethyl-pyrimidin-2-one, 4-hydroxylamino-5-aza-pyrimidin-2-one, 4-hydroxylamino-6-aza-pyrimidin-2-one, 4-hydroxylamino-pyrimidin-2-one, and 4-hydroxylamino-pyrimidin-2-thione.

4. The compound of claim 2 wherein said compound is a β-D-ribo isomer.

5. The compound of claim 3 wherein said compound is a β-D-ribo isomer.

6. The compound of claim 2 wherein $A^1$ has the formula —$CH_2OH$.

7. The compound of claim 3 wherein $A^1$ has the formula —$CH_2OH$.

8. The compound of claim 2 wherein $A^1$ has the formula —$CH_2I$.

9. The compound of claim 3 wherein $A^1$ has the formula —$CH_2I$.

10. The compound of claim 2 wherein $A^1$ has the formula —$CH_2OPO(OH)_2$.

11. The compound of claim 3 wherein $A^1$ has the formula —$CH_2OPO(OH)_2$.

12. The compound of claim 2 wherein $A^1$ has the formula —$CH_2N_3$.

13. The compound of claim 3 wherein $A^1$ has the formula —$CH_2N_3$.

14. The compound of claim 1 having the Formula II, and pharmaceutically acceptable salts thereof.

15. The compound of claim 14 wherein $R^1$ and $R^2$ are independently hydroxy or benzoyloxy or together form an isopropylidene group, and $B^2$ is selected from the group of purine and pyrimidine bases consisting of 6-(1-adamantylamino) purine, adenine, 2-fluoroadenine, 8-aza-9-deaza-adenine, 7-deaza-7-cyanoadenine, 8-azaadenine, cytosine, 5-fluorocytosine, 5-chlorocytosine, 5-lower alkyl cytosine, 5-trifluoromethylcytosine, 5-hydroxymethylcytosine, 5-azacytosine, 6-azacytosine, uracil, 5-fluorouracil, 5-chlorouracil, 5-lower alkyl uracil, 5-azauracil, 6-azauracil, 4-hydroxylamino-5-fluoro-pyrimidin-2-one, 4-hydroxylamino-5-lower alkyl-pyrimidin-2-one, 4-hydroxylamino-5-trifluoromethyl-pyrimidin-2-one, 4-hydroxylamino-5-aza-pyrimidin-2-one, 4-hydroxylamino-6-aza-pyrimidin-2-one, and 4-hydroxylamino-pyrimidin-2-one.

16. The compound of claim 14 wherein said compound is a β-D-ribo isomer.

17. The compound of claim 15 wherein said compound is a β-D-ribo isomer.

18. The compound of claim 14 wherein $A^2$ has the formula —$CH_3$.

19. The compound of claim 15 wherein $A^2$ has the formula —$CH_3$.

20. The compound of claim 14 wherein $A^2$ has the formula —$CH_2NH_2$.

21. The compound of claim 15 wherein $A^2$ has the formula —$CH_2NH_2$.

22. The compound of claim 1 having the Formula III, and pharmaceutically acceptable salts thereof.

23. The compound of claim 22 wherein $R^1$ and $R^2$ are independently hydroxy or benzoyloxy or together form an isopropylidene group, and $B^3$ is selected from the group of purine and pyrimidine bases consisting of 6-(1-adamantylamino)purine, 6-mercaptopurine, 2-fluoroadenine, 8-aza-9-deazaadenine, 7-deaza-7-cyanoadenine, 8-azaadenine, cytosine, 5-fluorocytosine, 5-iodocytosine, 5-lower alkyl cytosine, 5-trifluoromethylcytosine, 5-hydroxymethylcytosine, 5-azacytosine, 6-azacytosine, 2-thiocytosine, uracil, 5-fluorouracil, 5-iodouracil, 5-lower alkyl uracil, 5-azauracil, 6-azauracil, 4-hydroxylamino-5-fluoro-pyrimidin-2-one, 4-hydroxylamino-5-lower alkyl-pyrimidin-2-one, 4-hydroxylamino-5-trifluoromethyl-pyrimidin-2-one, 4-hydroxylamino-5-aza-pyrimidin-2-one, 4-hydroxylamino-6-aza-pyrimidin-2-one, 4-hydroxylamino-pyrimidin-2-one, and 4-hydroxylamino-pyrimidine-2-thione.

24. The compound of claim 22 wherein said compound is a β-D-ribo isomer.

25. The compound of claim 23 wherein said compound is a β-D-ribo isomer.

26. The compound of claim 1 having the Formula XV, and pharmaceutically acceptable salts thereof.

27. The compound of claim 26, wherein $A^4$ is —$CH_2OH$.

28. The compound of claim 26 wherein $A^4$ is —$CH_2I$.

29. The compound of claim 26 wherein $A^4$ is —$CH_2N_3$.

30. The compound of claim 26 wherein $A^4$ is —$CH_2OPO(OH)_2$.

31. The compound of claim 26 wherein $A^4$ is

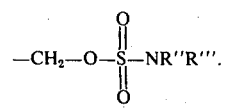

32. The compound of claim 1 having the formula XVI, and pharmaceutically acceptable salts thereof.

33. The compound of claim 32 wherein $A^2$ is —$CH_3$.

34. The compound of claim 32 wherein $A^2$ is —$CH_2NH_2$.

35. The process of preparing the compounds of claim 1 having the Formula I wherein $A^1$ is —$CH_2I$, said process comprising treating a compound having the formula:

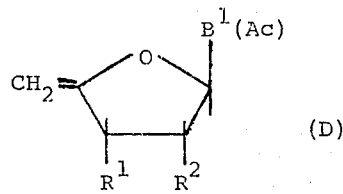

where $R^1$ and $R^2$ are as defined in claim 1, and $B^1$ (Ac) represents a pyrimidine or purine base moiety as defined in claim 1, wherein the free amino groups and the ring nitrogen at position 1 in said purine base moiety are protected with an acyl group having from 2 through 12 carbon atoms or a compound having the formula:

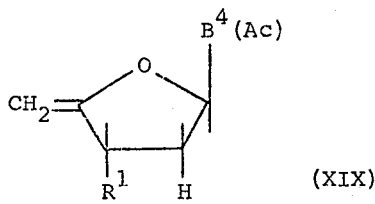

where R¹ is as defined in claim 1, and B⁴(Ac) represents a pyrimidine base moiety as defined in claim 1 wherein the free amino groups are protected with an acyl group having from 2 through 12 carbon atoms, with iodine fluoride under reactive conditions in an inert organic solvent to thereby afford said compound of Formula I where A¹ is —CH₂I or said compound of Formula XV where A⁴ is —CH₂I, respectively.

36. A process for preparing the compounds of claim 1 of formulas I and XV wherein A¹ and A⁴ are each —CH₂OH, which comprises treating the corresponding intermediate of formula I or XV, wherein A¹ or A⁴ is —CH₂N₃, and wherein said intermediate does not have an amino function on the base moiety, with NOBF₄, under reactive conditions thereby affording the corresponding 4'-fluoro nucleoside of formula I or XV wherein A¹ or A⁴ is —CH₂OH.

37. A process for preparing the compounds of claim 1 of formulas I and XV wherein A¹ and A⁴ are each —CH₂OH which comprises treating the corresponding intermediate of formula I or XV wherein A¹ and A⁴ is —CH₂N₃, and wherein the base moiety of said intermediate is not 4-thiouracil or 2,4-thiouracil, by photolysis, in an inert organic solvent, at a wave length of about from 290 m$\mu$ to about 330 m$\mu$ to afford the corresponding 5'-aldehyde nucleoside and reducing said 5'-aldehyde nucleoside to the corresponding compound of formula I or XV wherein A¹ or A⁴ is —CH₂OH.

* * * * *

UNITED STATES PATENT AND TRADEMARK OFFICE
CERTIFICATE OF CORRECTION

PATENT NO. : 3,928,319
DATED : December 23, 1975
INVENTOR(S) : IAN JENKINS ET AL It is certified that error appears in the above-identified patent and that said Letters Patent are hereby corrected as shown below:

Column 13, line 49, before "the" insert -- 2 to 3 hours. Then the trichloroethyl protecting group on --.

Signed and Sealed this

Fifth Day of April 1977

[SEAL]

Attest:

RUTH C. MASON
Attesting Officer

C. MARSHALL DANN
Commissioner of Patents and Trademarks